US012646048B2

(12) United States Patent
Iyer et al.

(10) Patent No.: US 12,646,048 B2
(45) Date of Patent: Jun. 2, 2026

(54) METHODS AND SYSTEMS FOR PAYMENT TRANSACTION AT MERCHANT DEVICE FROM CUSTOMER WALLET

(71) Applicant: Mastercard International Incorporated, Purchase, NY (US)

(72) Inventors: Laxmi Iyer, Pune (IN); Rajeev Kumar, Benares (IN); Venkatesh Jagalpure, Pune (IN); Vijay Kasul, Hyderabad (IN); Abhay Mandloi, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 684 days.

(21) Appl. No.: 17/172,745

(22) Filed: Feb. 10, 2021

(65) Prior Publication Data

US 2021/0264409 A1 Aug. 26, 2021

(30) Foreign Application Priority Data

Feb. 26, 2020 (IN) ............................. 202041008221

(51) Int. Cl.
G06Q 20/36 (2012.01)
G06Q 20/32 (2012.01)
(Continued)

(52) U.S. Cl.
CPC ..... G06Q 20/3674 (2013.01); G06Q 20/3821 (2013.01); G06Q 20/4012 (2013.01); G06Q 20/40145 (2013.01)

(58) Field of Classification Search
CPC ........... G06Q 20/3674; G06Q 20/3229; G06Q 20/4012
(Continued)

(56) References Cited

U.S. PATENT DOCUMENTS 9,646,295 B1 * 5/2017 Kanuganti ........... G06Q 20/202
10,339,291 B2 7/2019 Ibrahim et al.
(Continued)

FOREIGN PATENT DOCUMENTS

IN 201621012548 4/2018
KR 20150142532 * 12/2015
(Continued)

OTHER PUBLICATIONS

Springer Article by Adam Wojtowicz; et al entitled Technical Feasibility of Context-Aware Passive Payment Authorization for Physical Points of Sale (Jun. 17, 2017).
(Continued)

*Primary Examiner* — Wodajo Getachew
(74) *Attorney, Agent, or Firm* — Hovey Williams LLP

(57) ABSTRACT

Embodiments provide methods and systems of enabling an electronic payment from a merchant device using customer credential when a customer does not have mobile device or card with him. The customer enters customer credential, associated with a customer wallet, on a merchant wallet application accessible in the merchant device. The customer credential and merchant credential are transmitted to a server system associated with a payment network. The server system validates the customer credential, generates and transmits a pull payment request to a customer wallet server for approval of the payment request for transferring funds from customer wallet to the merchant wallet. After the approval, the server system transmits the successful payment response to the merchant device.

11 Claims, 21 Drawing Sheets

(51) Int. Cl.
G06Q 20/38 (2012.01)
G06Q 20/40 (2012.01)

(58) Field of Classification Search
USPC .......................................................... 705/67
See application file for complete search history.

(56) References Cited

U.S. PATENT DOCUMENTS

| | | | | | |
|---|---|---|---|---|---|
| 2002/0042776 | A1* | 4/2002 | Woo | ...................... | G06Q 20/12 |
| | | | | | 705/40 |
| 2003/0046237 | A1 | 3/2003 | Uberti | | |
| 2013/0297390 | A1* | 11/2013 | Jaquez | ................... | G06Q 20/36 |
| | | | | | 705/41 |
| 2015/0302413 | A1 | 10/2015 | Dua | | |
| 2016/0005038 | A1* | 1/2016 | Kamal | ............... | G06Q 20/3223 |
| | | | | | 705/44 |
| 2016/0042345 | A1* | 2/2016 | Kopczynski | ....... | G06Q 20/3678 |
| | | | | | 705/69 |

| | | | | | |
|---|---|---|---|---|---|
| 2016/0092878 | A1* | 3/2016 | Radu | .................. | G06Q 20/4012 |
| | | | | | 705/72 |
| 2017/0286949 | A1* | 10/2017 | Gurunathan | ......... | G06Q 20/405 |
| 2019/0392277 | A1* | 12/2019 | Agrawal | .............. | G06Q 20/405 |
| 2020/0065800 | A1* | 2/2020 | Kusnanto | .............. | G06Q 20/12 |
| 2020/0074495 | A1* | 3/2020 | Unnerstall | ......... | G06Q 30/0238 |
| 2021/0233052 | A1* | 7/2021 | Tharoor | ................. | G06Q 20/20 |
| 2021/0357915 | A1* | 11/2021 | Makrides | ............. | G06Q 20/384 |

FOREIGN PATENT DOCUMENTS

| | | | | | |
|---|---|---|---|---|---|
| KR | 20150142532 A | * | 12/2015 | ............. | G06Q 20/40 |
| KR | 20200064740 A | * | 6/2020 | | |
| WO | 2019114782 | | 6/2019 | | |
| WO | 2019162957 | | 8/2019 | | |

OTHER PUBLICATIONS

BusinessWire Article entitled Trantrum Street Introduces Revolutionary Mobile Payment App, Skip Wallet (Oct. 16, 2013).

* cited by examiner

102

104

SERVER
SYSTEM
118

SECOND
WALLET
SERVER
110

ENTER
CUSTOMER
CREDENTIAL

202

TRANSMIT
CUSTOMER
CREDENTIAL +
MERCHANT
CREDENTIAL
+ PAYMENT DETAIL

204

AUTHENTICATE
CUSTOMER
CREDENTIAL
AND GENERATE
PAYMENT REQUEST

206

SEND PAYMENT
REQUEST

208

VALIDATE
PAYMENT
REQUEST
AND
APPROVE

210

SUCCESSFUL
PAYMENT
RESPONSE

212

SUCCESSFUL
PAYMENT
RESPONSE

214

200

PLEASE ENTER PIN

★ ★ ★ ★

702

TRANSACTION
SUCCESSFUL!!!

710

DOWNLOAD
RECEIPT

702

*802*

*802*

|         | 902 | 904 | 906 | 908 | 910 |
|---|---|---|---|---|---|
| | VPA | SERVICE PASSWORD | DEVICE ID | SIM DETAILS | MOBILE NUMBER |
| | abc@ybc | 1xxx | D1 | 123456789012/01 | 73xxxxxxxx |
| | abc@rst | 3xxx | D1 | 123456789012/02 | 98xxxxxxxx |
| | xyz@rst | 4xxx | D2 | 123458926/01 | 76xxxxxxxx |

| 952 | 954 | 956 | 958 | 960 | 962 |
|---|---|---|---|---|---|
| TRANSACTION ID | VPA OF CUSTOMER WALLET | PASSWORD VALIDATION | VPA OF MERCHANT WALLET | DEVICE ID OF MERCHANT | TRANSACTION AMOUNT |
| 1234567 | abc@ybc | y | xyz@rst | D2 | 2300 |

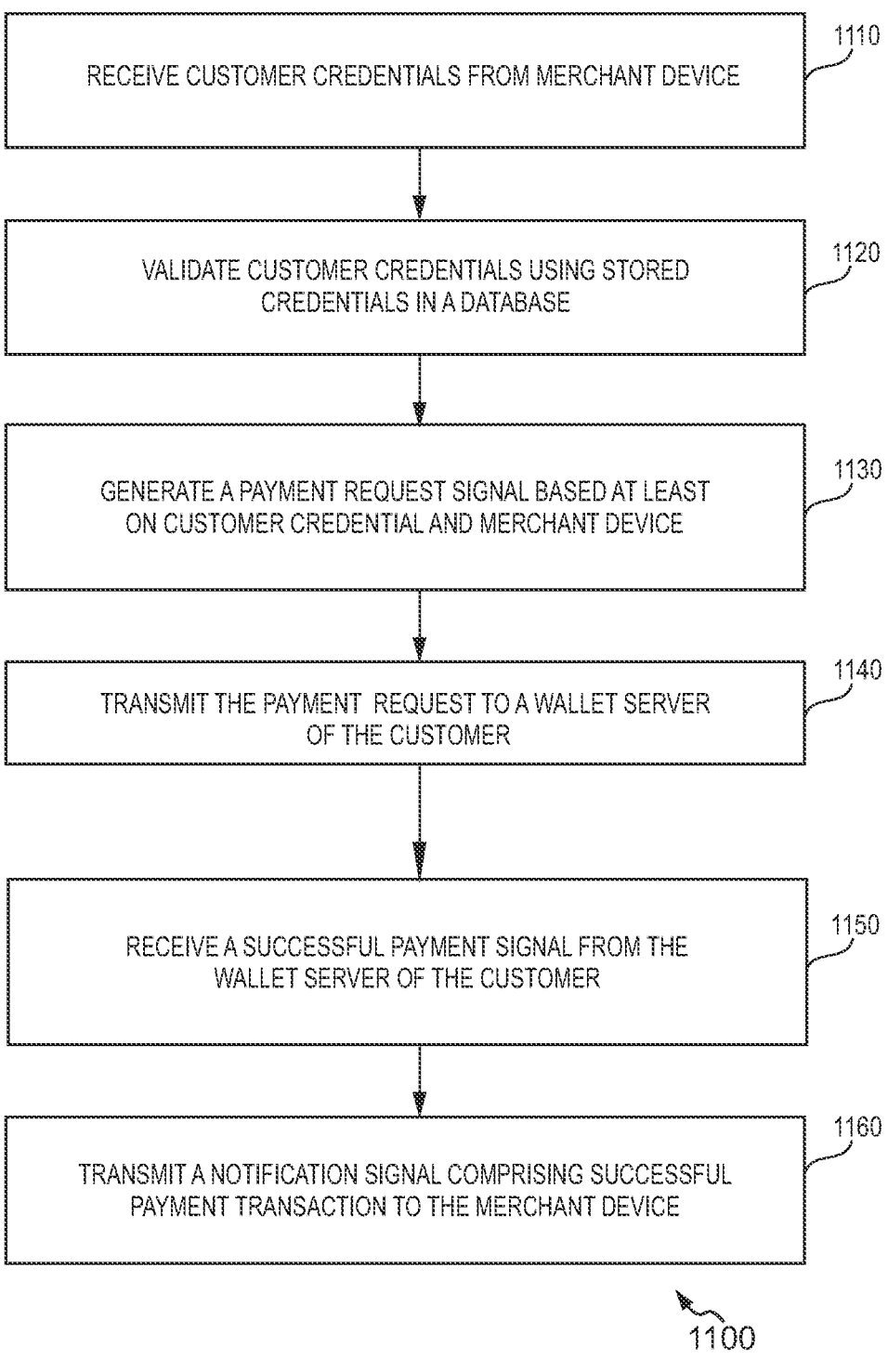

RECEIVE CUSTOMER CREDENTIALS FROM MERCHANT DEVICE — 1110

VALIDATE CUSTOMER CREDENTIALS USING STORED CREDENTIALS IN A DATABASE — 1120

GENERATE A PAYMENT REQUEST SIGNAL BASED AT LEAST ON CUSTOMER CREDENTIAL AND MERCHANT DEVICE — 1130

TRANSMIT THE PAYMENT REQUEST TO A WALLET SERVER OF THE CUSTOMER — 1140

RECEIVE A SUCCESSFUL PAYMENT SIGNAL FROM THE WALLET SERVER OF THE CUSTOMER — 1150

TRANSMIT A NOTIFICATION SIGNAL COMPRISING SUCCESSFUL PAYMENT TRANSACTION TO THE MERCHANT DEVICE — 1160

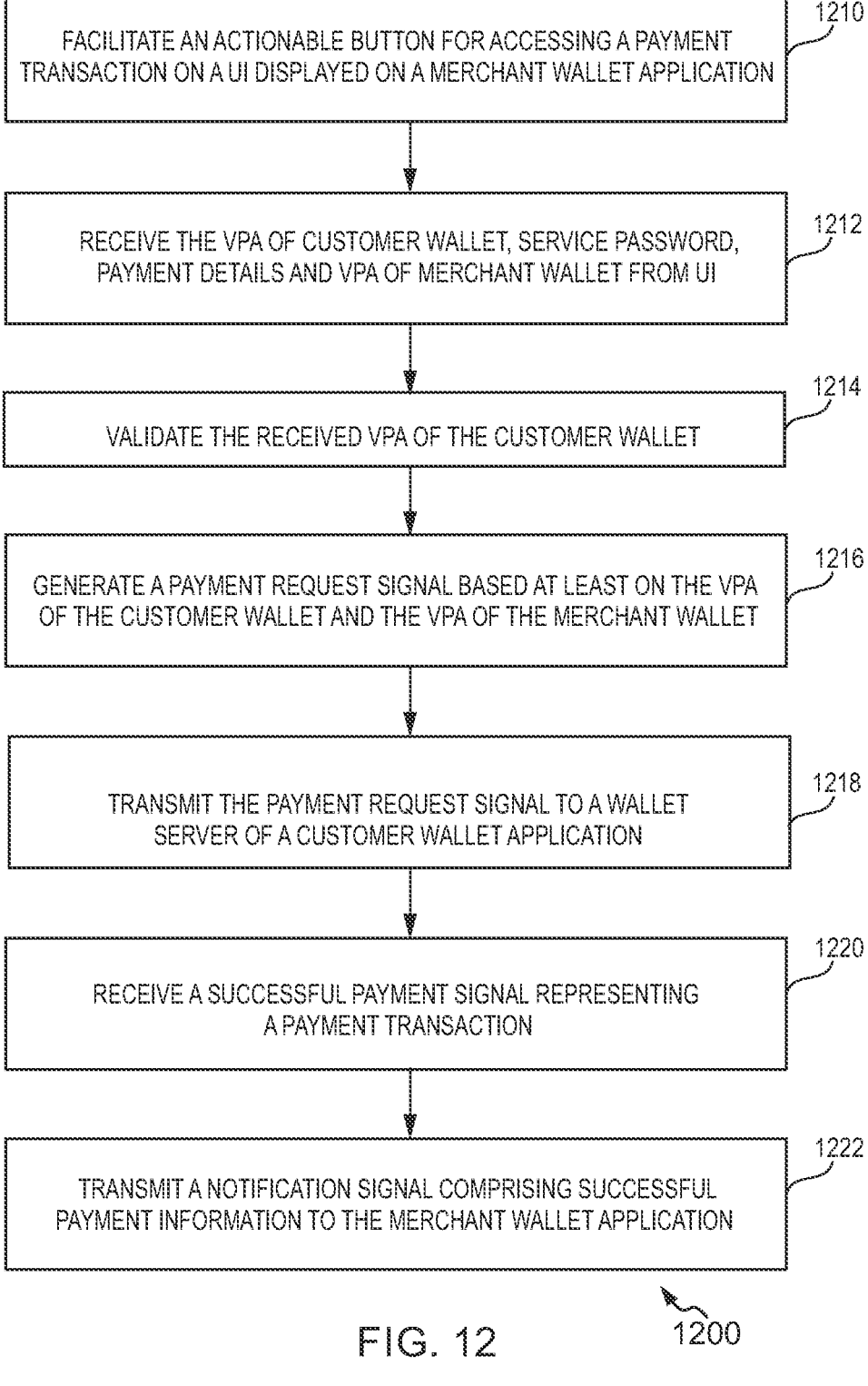

FACILITATE AN ACTIONABLE BUTTON FOR ACCESSING A PAYMENT TRANSACTION ON A UI DISPLAYED ON A MERCHANT WALLET APPLICATION   1210

RECEIVE THE VPA OF CUSTOMER WALLET, SERVICE PASSWORD, PAYMENT DETAILS AND VPA OF MERCHANT WALLET FROM UI   1212

VALIDATE THE RECEIVED VPA OF THE CUSTOMER WALLET   1214

GENERATE A PAYMENT REQUEST SIGNAL BASED AT LEAST ON THE VPA OF THE CUSTOMER WALLET AND THE VPA OF THE MERCHANT WALLET   1216

TRANSMIT THE PAYMENT REQUEST SIGNAL TO A WALLET SERVER OF A CUSTOMER WALLET APPLICATION   1218

RECEIVE A SUCCESSFUL PAYMENT SIGNAL REPRESENTING A PAYMENT TRANSACTION   1220

TRANSMIT A NOTIFICATION SIGNAL COMPRISING SUCCESSFUL PAYMENT INFORMATION TO THE MERCHANT WALLET APPLICATION   1222

FIG. 12    1200

NON-REMOVABLE MEMORY 1308

POWER SUPPLY 1352

TRANSCEIVER 1356

USER IDENTITY MODULE 1312

REMOVABLE MEMORY 1310

SENSOR (S) 1354

PROCESSOR 1302

PHYSICAL CONNECTOR 1360

INPUT DEVICE (S) 1320

TOUCHSCREEN 1322

MICROPHONE 1324

CAMERA MODULE 1326

PHYSICAL KEYBOARD 1328

OUTPUT DEVICE (S) 1330

SPEAKER 1332

DISPLAY 1334

OPERATING SYSTEM 1304

WIRELESS MODEM 1340

CELLULAR MODEM 1342

WI-FI 1344

BLUETOOTH 1346

APPLICATIONS 1306

1300

1500

METHODS AND SYSTEMS FOR PAYMENT TRANSACTION AT MERCHANT DEVICE FROM CUSTOMER WALLET

CROSS REFERENCE TO RELATED APPLICATIONS

This application claims priority to Indian Application No. 202041008221, filed Feb. 26, 2020, which is incorporated herein by reference in its entirety

TECHNICAL FIELD

The present disclosure relates to an electronic payment technology and, more particularly to, an electronic payment carried out on a merchant device using customer credential in which payment is made from a customer wallet to a merchant wallet.

BACKGROUND

Nowadays a large volume of the electronic payment transactions is either done by customers' mobile phones or by using several banking cards, such as credit cards, debit cards, prepaid cards, etc., for performing financial transactions (e.g., payment transaction). The various banking cards are herein referred to as payment cards. The payment cards are increasingly used for making payments through various channels, such as physical card swipe at point-of-sale (POS) terminals, digital payments, contactless payments, etc. The digital payment industry is moving towards providing a better experience for both customers and merchants. Customers digitize the payment cards into mobile phones, wearable devices, etc., using technologies, such as tokenization, Card-on-File (COF) transactions, digital wallets and the like.

Real-time payment system that facilitates inter-bank transactions is widely in use these days. One example of such a real-time payment system is Unified Payments Interface (UPI) in India and some other geographies. The interface works by instantly transferring funds between two bank accounts on a mobile platform. However, in situations when a customer does not have his mobile device or loses his mobile device, it becomes difficult for the customer to conduct the payment transaction. In current scenarios, governing regulations do not allow the customer to make a login in other devices for payments using a virtual payment address. For example, UPI payments require details related to a Subscriber Identification Module (SIM) and device of the customer linked to the registered mobile number of the customer, for making any payment transaction.

Accordingly, there exists a need to overcome the above-mentioned drawbacks and enable electronic payment transactions when a customer does not have his mobile phone, payment card, or cash with him.

SUMMARY

Various embodiments of the present disclosure provide systems and methods for enabling an electronic payment from a merchant device using customer credential in which payment is made from a customer wallet to a merchant wallet.

In an embodiment, a method, performed by a server system associated with a payment network, of enabling an electronic payment from a merchant device is disclosed. The method includes receiving a customer credential from a merchant wallet application accessible in the merchant device. The method further includes validating the received customer credential based at least on a stored customer credential present in a database accessible to the server system and generating a payment request signal based at least on the customer credential and a merchant credential. The method further includes transmitting the payment request signal to a wallet server of the customer and receiving a successful payment signal representing a payment transaction from the wallet server of the customer to a wallet server of the merchant. Further, the method includes transmitting a notification signal including successful payment information to the merchant device.

In another embodiment, a server system associated with a payment network of enabling an electronic payment from a merchant device is disclosed. The server system includes a communication interface, a storage interface, a memory including stored instructions, and at least one processor communicably coupled to the memory. The processor is configured to execute the stored instructions to cause the server system to receive a customer credential from a merchant wallet application accessible in the merchant device, validate the received customer credential based at least on a stored customer credential present in a database accessible to the server system, generate a payment request signal based at least on the customer credential and a merchant credential, transmit the payment request signal to a wallet server of the customer, receive a successful payment signal representing a payment transaction from the wallet server of the customer to a wallet server of the merchant, and transmit a notification signal including successful payment information to the merchant device.

In yet another embodiment, a method, performed by a server system associated with a payment network, of enabling an electronic payment from a merchant device is disclosed. The method includes facilitating, an actionable button for accessing a payment transaction service on a user interface (UI) displayed on a merchant wallet application, wherein the actionable button is accessed by a customer to provide a virtual payment address (VPA) of the customer wallet and a service password for the customer to access the payment transaction service, and wherein the UI is associated with the server system. The method further includes receiving the VPA of the customer wallet, the service password, payment details, and a VPA of a merchant wallet from the UI in the merchant wallet application accessible in the merchant device. The method further includes validating the received VPA of the customer wallet and the service password based at least on a stored VPA of the customer wallet and service password present in a database accessible to the server system and generating a payment request signal based at least on the VPA of the customer wallet and the VPA of the merchant wallet. Further, the method includes transmitting the payment request signal to a wallet server of a customer wallet application. The method includes receiving a successful payment signal representing a payment transaction from the wallet server of the customer to a wallet server of the merchant and transmitting a notification signal including successful payment information to the merchant wallet application on the merchant device.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIGS. 9A-9B illustrate example representations of databases storing virtual payment address and transaction information;

FIG. 11 is a flow diagram depicting a method for enabling electronic payment from a merchant device, in accordance with an embodiment;

FIG. 12 is a flow diagram depicting a method for enabling electronic payment from the merchant device, in accordance with another embodiment;

Figure 1:
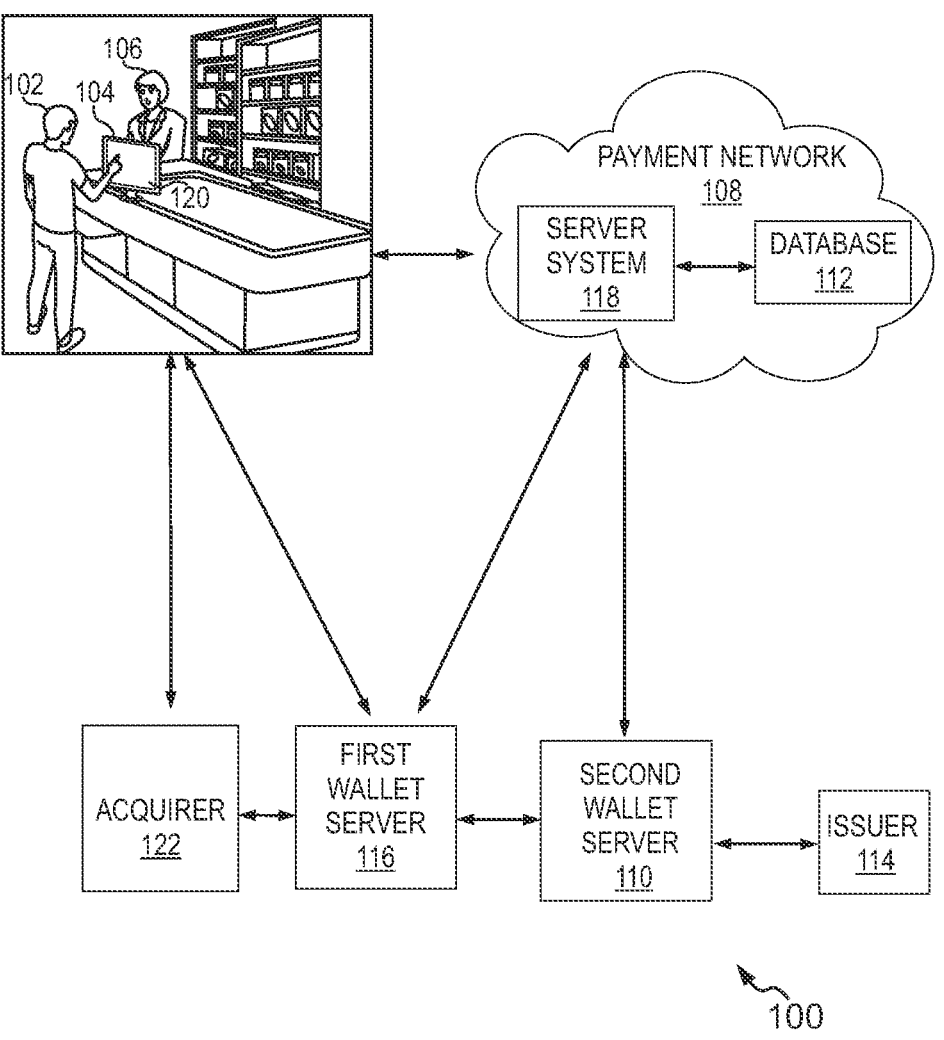
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment network", refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

The term "server system", may correspond to a payment server, a server associated with a payment gateway, an acquirer server, an issuer server, a third-party server or a combination of one or more such servers.

The term "merchant device", refers to mobile device with camera and scanner, biometric capturing device, a tablet device, a Personal Digital Assistant (PDA), a voice activated assistant, a smartphone, a laptop, a computer or a data processing devices for processing payment at merchant locations, a payment gateway and/or a merchant online interface for allowing customers, cardholders, or account holders to make offline and/or online purchases. The merchant device may be construed as any virtual or physical electronic system that accepts the cardholder's payment transaction requests, and forwards such requests to any of the entities such as acquirer server, payment interchange servers (e.g., payment server) and/or issuer server for the purposes of carrying out the payment transaction.

Herein the term "customer" used throughout the description refers to a user, a cardholder, an authorized person performing on-behalf transaction of another user, who can make a payment transaction or any financial transactions using a payment account such as credit card, debit card, wallet application, tokenized card, etc.

Overview

Various example embodiments of the present disclosure provide system and methods for enabling an electronic payment. More specifically, techniques disclosed herein enable an electronic payment at a merchant device using customer credential in scenarios, when the customer need not carry his card, cash, or mobile phone to carry out an electronic payment. The payment is made from a customer wallet to a merchant wallet using the merchant device, and more specifically, by using an option facilitated in a merchant wallet application, by the customer.

In one embodiment, a server system facilitates processing of payment transactions between customers and merchants. More specifically, the server system facilitates payment transaction from a customer wallet to another payment account including, but not limited to, another wallet (e.g., the merchant wallet or any payee wallet), where the transaction from the customer wallet is initiated from the merchant device via means including, but not limited to, the merchant wallet application. Without loss of generality, the server system may be associated with a payment server of a payment interchange network. The customer and the merchant can be registered with the server system for availing the service (hereinafter termed as 'payment transaction service') of payment transaction from the customer wallet to the merchant wallet, where the transaction is initiated by invoking an option in the merchant wallet application present in the merchant device. In an embodiment, the server system, via application programming interfaces (APIs), can communicate with the customer wallet application and merchant wallet application, and can process the payment transaction.

Initially, a customer may register with the server system for availing the payment transaction service using customer credential on the customer device. Examples of the customer credential may be a virtual payment address (VPA) of the customer wallet application, biometric credential, and a service password associated with the payment transaction service provided by the server system. Herein, the term "service password" refers to any password that may have been setup for using the payment transaction service by the customer during the registration process. An example of the service password can be a personal identification number (PIN), a pattern, or an alphanumeric password. The customer credential is captured at the customer device and transmitted to the server system. The server system may store the customer credential in a database which is accessible to the server system. In an embodiment, the merchant also registers with the server system. For instance, the merchant can register one or more wallet applications of the merchant with corresponding identifiers (IDs) with the server system, and their records can be maintained in the database accessible to the server system.

In an example, a registered customer (i.e. the customer registered for the payment transaction service) may visit a registered merchant (i.e. the merchant registered for the payment transaction service) without having the customer device normally authorized to use the customer wallet application. In this example, the customer may provide the customer credential via the merchant wallet application present on the merchant device. For instance, an option (e.g., an actionable button) may be present in the merchant wallet application, which can be selected by the customer to provide the customer credential. The customer credential may be transmitted to the server system for authentication of the customer credential. The payment details and merchant credentials may also be transmitted to the server system. The server system compares the received customer credential with the stored credential in the database which were provided at the time of registration of the customer. If the customer credential matches with the stored credential, then the customer is authenticated and the transaction proceeds to next steps. However, if the customer credential does not match with the stored credential, the customer is not authenticated and the server system declines the transaction. The customer is notified of the declined transaction on the merchant device.

After authentication of the customer, the server system proceeds with the transaction. The server system generates a payment request. In an embodiment, the payment request is generated using the customer credential, payment details, and the merchant credentials. The payment request is transmitted to a customer wallet server associated with the customer wallet. The customer wallet server validates the payment request and approves the payment enabling transfer of funds from the customer wallet to the merchant wallet. The customer wallet server notifies the server system regarding the successful transfer of funds. The customer is notified about the successful completion of transaction on the merchant device.

In at least one embodiment, once the customer is authorized at the server system, UI related to the payment options in the merchant wallet application are customized according to the customer preferences saved with the payment transaction service. For instance, the customer may be provided an option to select a mode of payment. For example, the customer may choose the deduction of the funds for payment directly from "XYZ" bank account instead of customer wallet or vice versa, or may choose a certain bank from multiple banks listed in the customer wallet.

One of the advantages of the embodiments of the present disclosure is that the customer does not need to carry his mobile device, cash, or card at a merchant store for conducting a financial transaction. The customer only needs to remember the customer credential and the service password for availing the payment transaction service linked to the customer wallet account to carry out the payment transaction. Hence, the dependency on mobile device of the customer is eliminated. Additionally or alternatively of providing VPA as the customer credential, the customer only needs to provide his biometric credentials like retina scan, or fingerprints scan etc., to perform the financial transaction. The biometric credential of the customer can be mapped against the customer wallet and the payment transaction service availed by the customer. Hence, the embodiments of the present disclosure facilitate the customer to perform the financial transaction in a secured manner without the need to carry the registered customer device such as mobile phone all the time, thereby avoiding the fraudulent transactions.

FIG. 1 illustrates an example representation of an environment 100 related to at least some example embodiments of the present disclosure. The environment 100 is depicted to include a server system 118 associated with a payment network 108. The payment network 108 further includes a database 112 that stores information related to a plurality of customers (e.g., a customer 102) and merchants (e.g., a merchant 106). The information corresponding to the customer 102 may include one or more virtual payment addresses (VPAs) of one or more wallet applications of the customer 102, service password(s) registered with the server system and associated with the customer credential, account details of the customer 102, device ID of a customer device, phone number of the customer 102, Subscriber Identification Module (SIM) details associated with the customer 102 etc.

The representation in FIG. 1 depicts the customer 102 using a merchant device 104 to carry out an electronic payment transaction. The customer 102 may enter his credentials on a merchant wallet application 120 present on the merchant device 104. In an illustrative example, the credentials may be a VPA of the customer wallet and a service password associated with the server system providing the payment transaction service. In another illustrative example, the credentials may be in the form of biometric data. The biometric data include, but are not limited to, a fingerprint of the customer 102, a facial identification data of the customer 102, an iris pattern of the customer 102, or the like. The merchant wallet application 120 is connected to a merchant wallet server 116 (also referred to as a first wallet server 116 or wallet server 116 of the merchant 106). The merchant wallet application 120 may additionally be connected to an acquirer 122. The acquirer 122 may correspond to a bank server in which merchant 106 has his account.

The merchant device 104 transmits the customer credential to the server system 118 for authentication of the request. The merchant device 104 also transmits merchant credentials and payment details to the server system 118 via the merchant wallet server 116. The merchant credentials include, but are not limited to, a VPA of the merchant wallet, wallet details of the merchant 106, etc. The payment details may include a total amount of funds to be transferred to the merchant wallet for a purchase made by the customer 102 from the merchant 106, etc. The server system 118 may verify the customer credentials by comparing them with the already stored credentials in the database 112. The server system 118 may optionally request a personal identification number (PIN) from the customer 102 in order to generate a payment request. The PIN (hereinafter termed as VPA-PIN) corresponds to the VPA of the customer wallet. The server system 118 may transmit the payment request to a customer wallet server 110 (also referred as second wallet server 110 or wallet server 110 of the customer 102) which may forward it to the issuer 114 (e.g., bank associated with a payment account of the customer 102) associated with the customer 102. The issuer 114 may approve the transaction and transmit the approved transaction message to the customer wallet server 110 which forwards it to the server system 118. The server system may forward the same to the merchant wallet application 120 in the merchant device 104. Alternatively, the customer wallet server 110 may approve the funds to be transferred to the merchant wallet from funds already available in the customer wallet.

Figure 2:
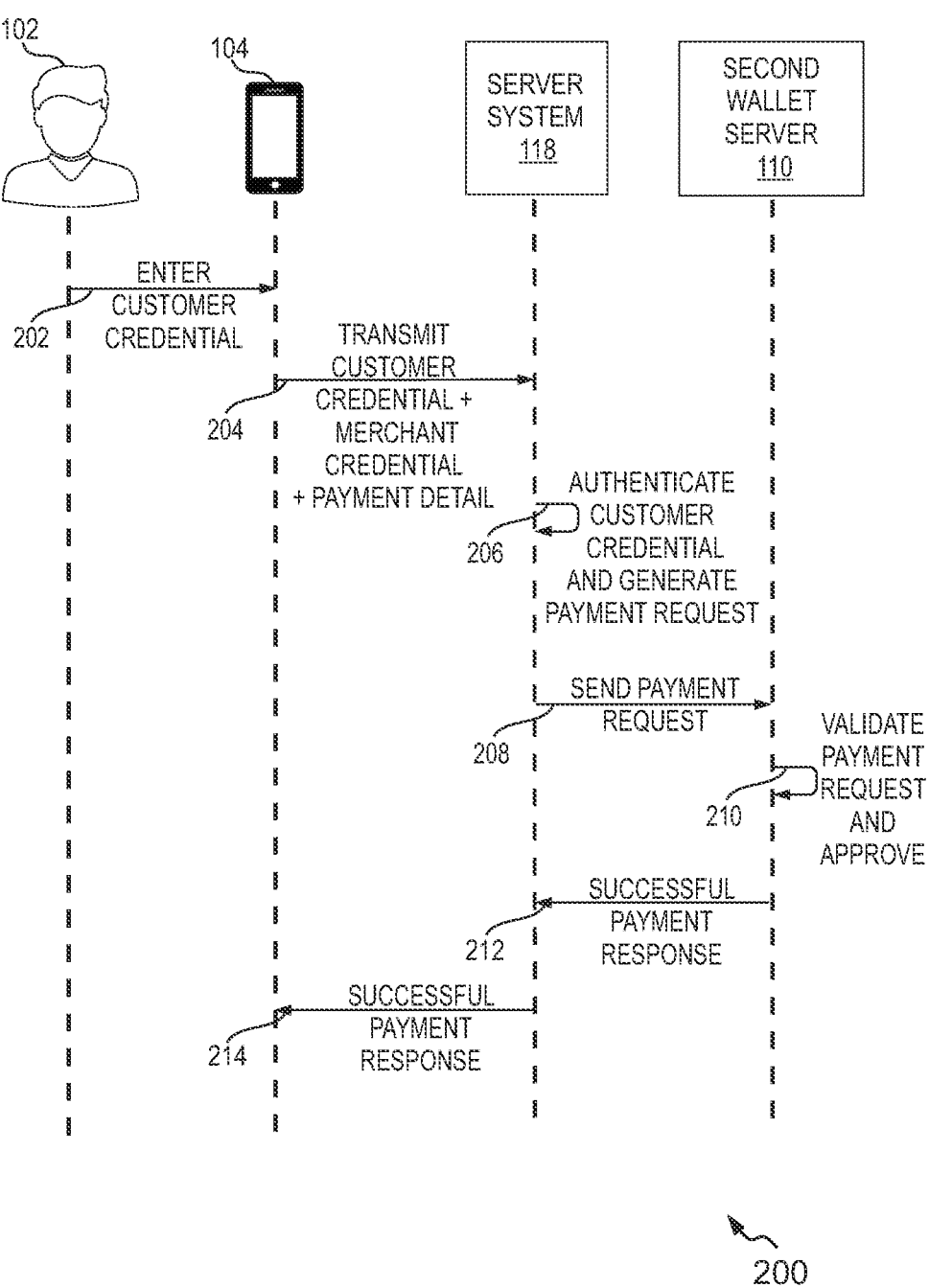
FIG. 2 is a sequence flow diagram for enabling an electronic payment in accordance with an embodiment.

FIG. 2 is a sequence flow diagram 200 for enabling an electronic payment from the merchant device 104. The sequence of operations of the sequence flow diagram 200 may not be necessarily executed in the same order as it is presented. Further, one or more operations may be grouped together and performed in the form of a single step, or one operation may have several sub-steps that may be performed in parallel or in a sequential manner.

The customer 102 visits the merchant store. The merchant device 104 has the merchant wallet application 120, which the merchant 106 allows to be used by the customer 102. The merchant wallet application 120 has an actionable button, which upon selection, directs the customer 102 to an application protocol interface of the server system that facilitates the payment transaction service.

At 202, the customer 102 enters customer credential on the application protocol interface displayed on the merchant wallet application 120. In one exemplary embodiment, the customer credential may be a VPA associated with the customer wallet application and a service password. It should be noted that the VPA can be an identifier (e.g., customername@bank1) of the customer on the customer wallet application. Some examples of the VPAs and service passwords are explained with reference to FIG. 9A. Alternatively or additionally, the customer credential may be in the form of biometric data. The biometric data may include, but is not limited to, fingerprints of the customer 102, facial identification data of the customer 102, an iris pattern of the customer 102, and the like. Examples of the merchant device 104 include, but are not limited to, a personal computer (PC), a workstation, a digital kiosk, a mobile phone, a tablet device, a Personal Digital Assistant (PDA), a voice activated digital assistant, a smartphone, a smart TV, a smart wearable device, and/or a laptop. In one exemplary embodiment, the customer 102 may enter the customer credential on the merchant wallet application 120 present on the merchant device 104. In another exemplary embodiment, the customer 102 may scan the biometric data on the merchant device 104.

At 204, the merchant device 104 transmits the customer credential, payment details, and the merchant credentials to the server system 118 associated with the payment network 108 for authentication. At 206, the server system 118 compares the customer credential received from the merchant device 104 with credentials already stored in the database 112. After authenticating the customer credential, the server system 118, at 206, further generates a payment request signal using the customer credential, payment details, and the merchant credentials. In case the customer credential received from the merchant device 104 does not match with the credential already stored in the database 112, then the server system 118 declines the transaction and the customer 102 is notified about the failed transaction due to incorrect credential provided on the merchant device 104.

At 208, the server system 118 transmits the payment request signal to a second wallet server 110 (i.e. wallet server of the customer 102). At 210, the second wallet server 110 validates the payment request and approves the payment to transfer funds from the first wallet (wallet of the merchant 106) to the second wallet (wallet of the customer 102). In 212, the second wallet server 110 transmits the successful payment response to the server system 118. The server system 118 forwards the successful payment response to the merchant device 104 which is displayed on the merchant device 104, at 214.

Figure 3:
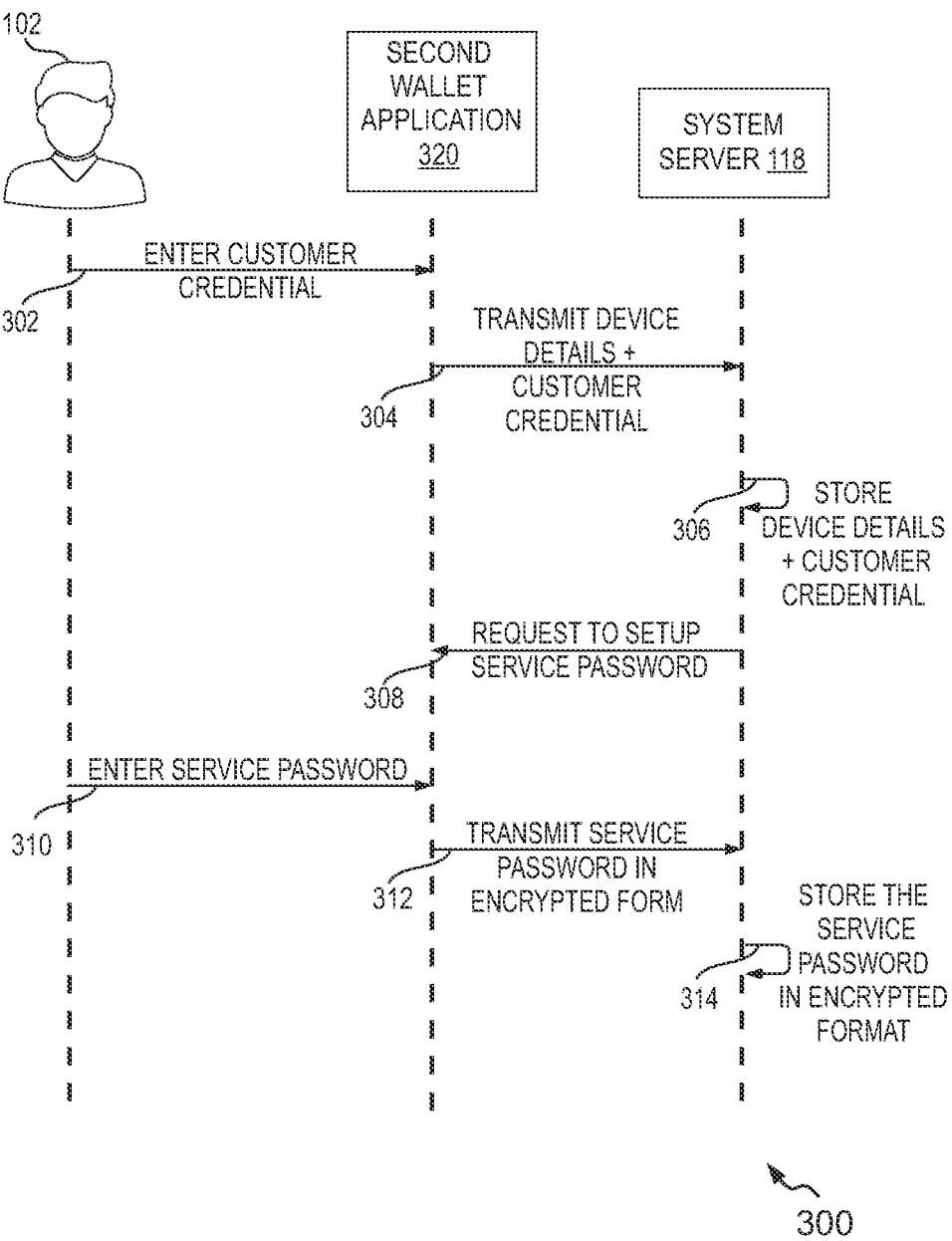
FIG. 3 is a sequence flow diagram for illustrating a registration process of customer credential with the server system on a customer device, in accordance with an embodiment.

FIG. 3 is a sequence flow diagram 300 depicting the registration process of customer credential with the server system 118 on a customer device. The sequence of operations of the sequence flow diagram 300 may not be necessarily executed in the same order as it is presented. Further, one or more operations may be grouped together and performed in the form of a single step, or one operation may have several sub-steps that may be performed in parallel or in a sequential manner.

A customer device has a customer wallet application 320 installed or available therein. The customer wallet application 320 has an actionable button which directs the customer 102 to an application protocol interface of the server system that facilitates the payment transaction service. At 302, the customer 102 enters his credential on the customer wallet application 320 (a second wallet application 320) present in the customer device. In one exemplary embodiment, the customer credential may be VPA associated with the customer wallet application 320 and service password. It should be noted that the VPA can be an identifier (e.g., customername@bank1) of the customer on the customer wallet application 320. Some examples of the VPAs are explained with reference to FIG. 9A. Alternatively or additionally, the customer credential may be in the form of biometric data. The biometric data include, but is not limited to, fingerprints of the customer 102, facial identification data of the customer 102, an iris pattern of the customer 102, or the like.

In one exemplary embodiment, the customer 102 may enter the customer credential on the customer wallet application 320 present in the customer device. In another exemplary embodiment, the customer 102 may scan the biometric data on the customer device.

The customer wallet application 320, at 304, transmits customer credential along with customer device details to the server system 118. The customer device details may include a device ID, a phone number of the customer 102, contact number and SIM details of the customer 102. The server system 118 stores the customer credential and customer device details in a database 112 at 306. Further, at 308, the server system 118 transmits a request on the customer wallet application 320 to set up a service password. The service password is associated with the payment transaction service provided by the server system 118. The customer 102 enters the service password at 310. The customer wallet application 320 transmits the service password entered by the customer 102 to the server system 118 in an encrypted format at 312. Further, at 314, the server system 118 stores the service password in an encrypted format in the database 112. The service password may be customized or updated by time to time.

Some non-exhaustive example embodiments of conducting electronic payment transactions without the use of card or mobile phone are described with reference to FIGS. 4A, 4B, 5A, 5B, and 6.

Figure 4A:
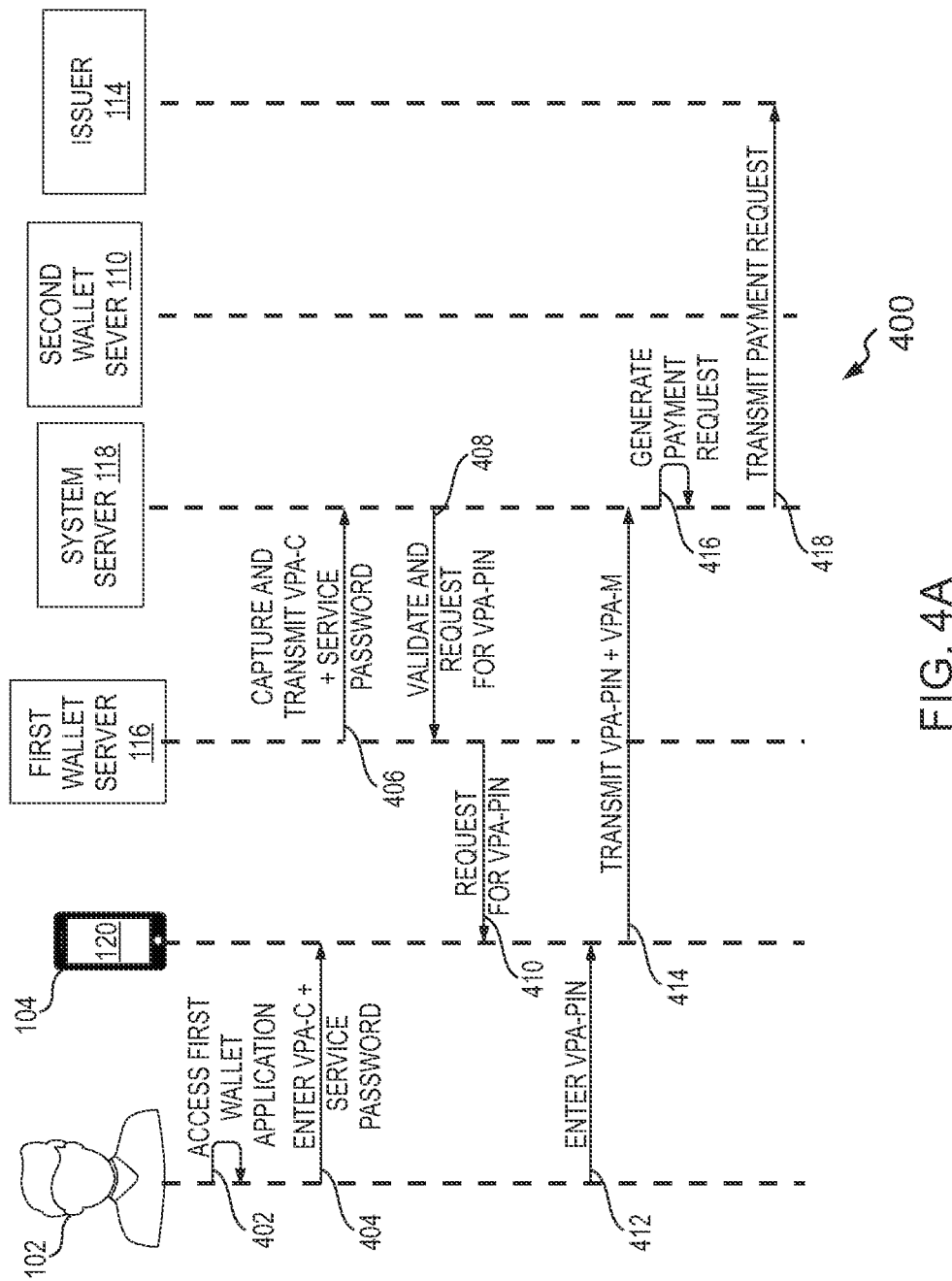
FIGS. 4A-4B, collectively, represent a sequence flow diagram of a method for a payment transaction on a merchant device, in accordance with an embodiment of the present disclosure.
Figure 4B:
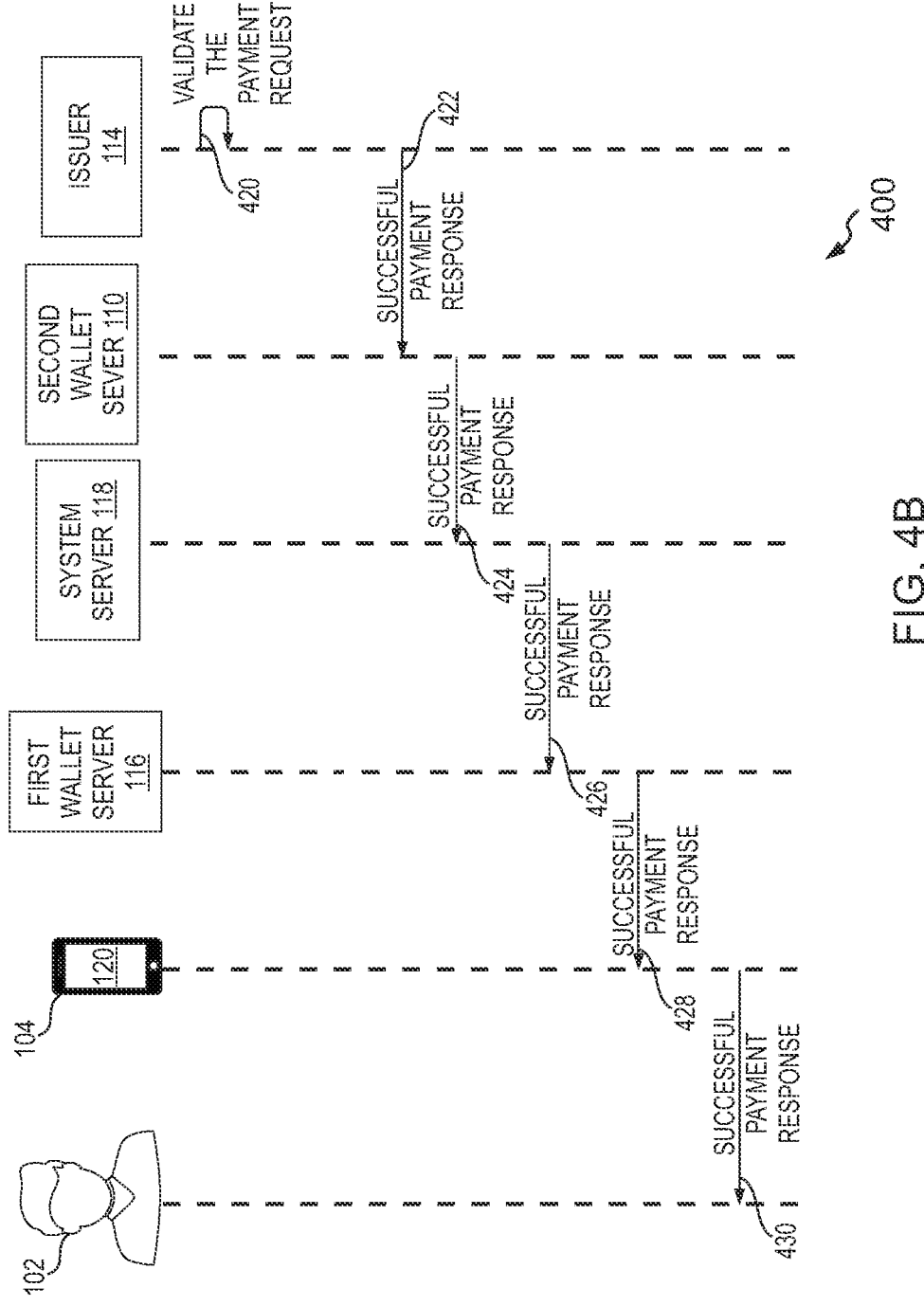

FIGS. 4A and 4B, collectively, represent a sequence flow diagram of a method 400 for a payment transaction on a merchant device, in accordance with an embodiment of the present disclosure. The sequence of operations of the method 400 may not be necessarily executed in the same order as it is presented. Further, one or more operations may be grouped together and performed in the form of a single step, or one operation may have several sub-steps that may be performed in parallel or in a sequential manner.

At 402, the customer 102 accesses the merchant wallet application (also referred to as "first wallet application") present in the merchant device 104 to make the payment transaction from the customer wallet (also referred to as "second wallet"). The merchant wallet application 120 has an actionable button representing the payment transaction service. The selection of the actionable button directs the customer 102 to an application protocol interface of the server system that facilitates the payment transaction service.

At 404, the customer 102 enters the VPA of the customer wallet (VPA-C) and service password in application protocol interface displayed on the merchant wallet application 120. It should be noted that the VPA can be an identifier (e.g., customername@bank1) of the customer on the customer wallet application 320. Some examples of the VPAs and service passwords are explained with reference to FIG. 9A.

At 406, the VPA of the customer wallet and the service password are captured by the merchant wallet server 116. The merchant wallet server 116 further transmits the VPA and the service password to the server system 118 associated with the payment network 108.

At 408, the server system 118 validates the VPA and service password of the customer 102 by comparing the received VPA and service password with corresponding values stored in a database (e.g., a VPA database 112a shown in FIG. 9A), accessible to the server system 118. After successfully validating the VPA, the server system 118 sends a request for fetching, from the customer 102, a personal identification number associated with the VPA (VPA-PIN)

of the customer wallet application 320. The server system 118 may send a signal to request the VPA-PIN from the customer.

At 410, the merchant wallet server 116 sends the request to the merchant wallet application 120 for fetching the VPA-PIN of the customer wallet. At 412, the customer 102 enters the VPA-PIN. The VPA-PIN along with a VPA of the merchant wallet are forwarded to the server system 118 at 414 via the merchant wallet server 116. It should be noted that the VPA of the merchant wallet can be an identifier (e.g., merchantname@bank2) of the merchant on the merchant wallet application.

The server system 118 generates a payment request signal at 416. Without loss of generality, the payment request signal is generated using the following data:

a) VPA of the customer wallet (VPA-C) and VPA of the merchant wallet (VPA-M);

b) contact number and SIM details of the customer 102 stored in the database 112;

c) device identification ID of the customer 102; and d) VPA-PIN associated with the VPA-C.

The server system 118 identifies an issuer 114 associated with the account of the customer 102 by VPA-C. At 418, the server system 118 transmits the payment request to the customer wallet server 110, where the customer wallet server 110 forwards the payment request to the issuer 114.

The issuer 114 validates the details in the payment request and processes the transaction to transfer the funds from the customer wallet to the merchant wallet after the validation at 420. After the completion of the transaction, at 422, the issuer 114 transmits a successful payment response. For instance, the successful payment response can be sent as a notification signal comprising the successful payment information to the customer wallet server 110. The customer wallet server 110 forwards the notification signal to the merchant wallet application 120 via the server system 118 and the merchant wallet server 116 (see, 424, 426, 428, and 430).

Figure 5A:
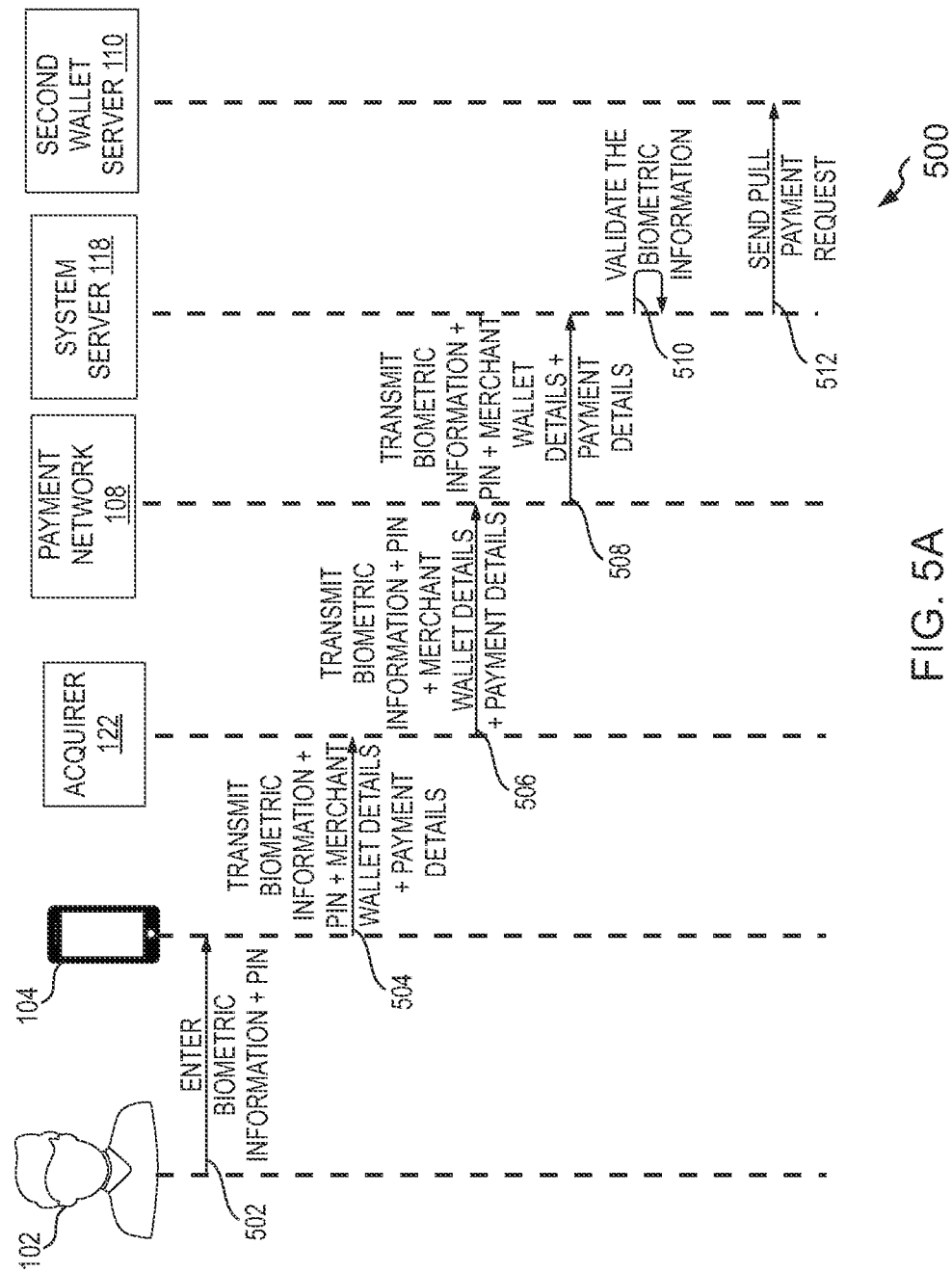
FIGS. 5A-5B, collectively, represent a sequence flow diagram of a method of payment transaction on a merchant device, in accordance with another embodiment of present invention.
Figure 5B:
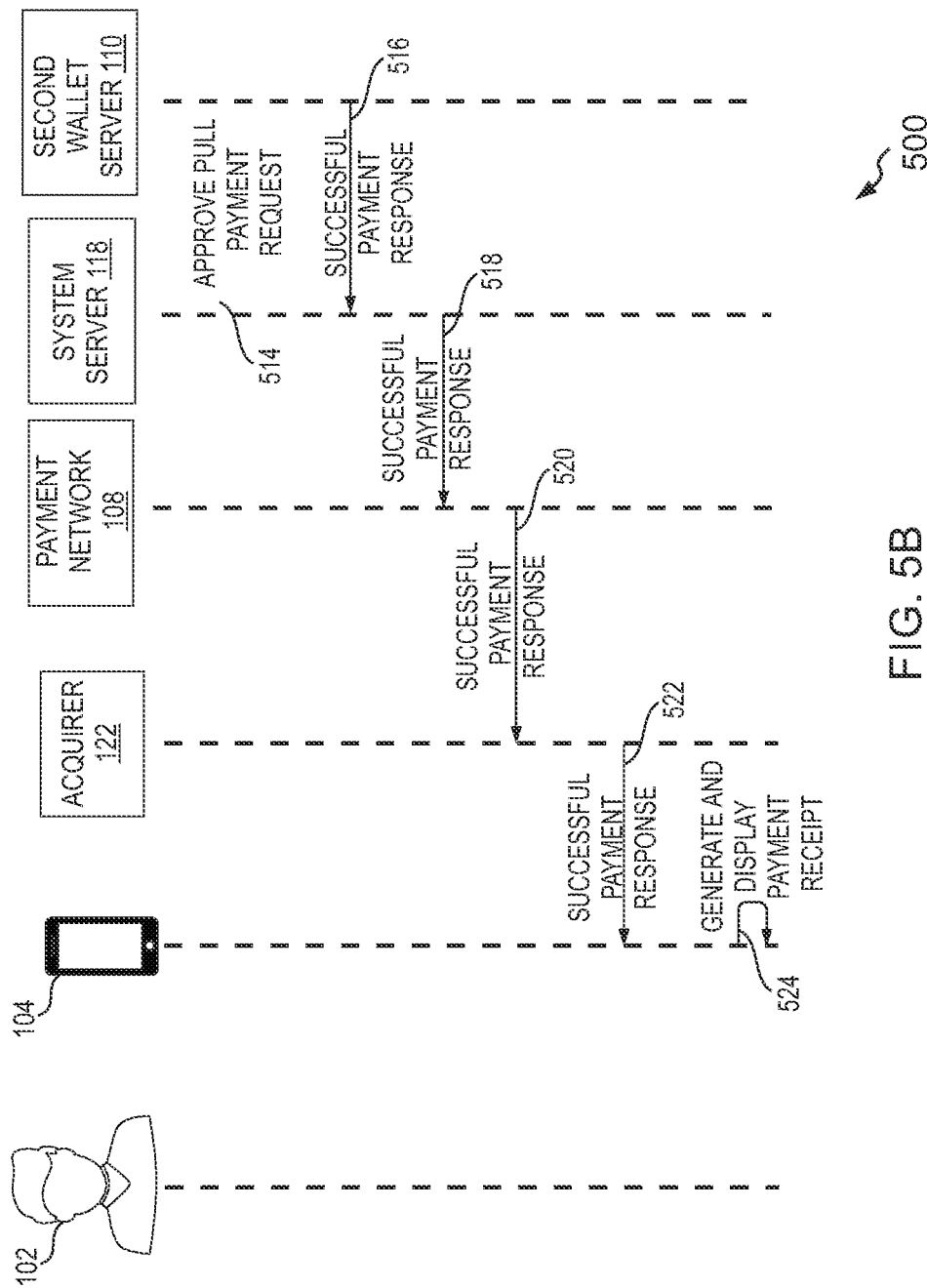

FIGS. 5A and 5B, collectively, represent a sequence flow diagram of a method 500 of payment transaction on the merchant device 104, in accordance with another embodiment of present invention. The sequence of operations of the method 500 may not be necessarily executed in the same order as it is presented. Further, one or more operations may be grouped together and performed in the form of a single step, or one operation may have several sub-steps that may be performed in parallel or in a sequential manner. It is to be noted that the customer 102 already registers customer biometric information and PIN with the server system in a registration process similar to that described in FIG. 3. A biometric database 112c that is accessible to the server system 118 stores biometric information and wallet details associated with the customer 102.

The method 500 is performed on the merchant device 104 which may be a POS terminal equipped to capture biometric credential and facilitate payment transaction. At 502, the customer 102 visits a merchant store for making a purchase. The customer 102 enters his biometric information and a personal identification number (PIN) on the merchant device 104. As described above, the biometric information includes, but is not limited to, a fingerprint of the customer 102, a facial identification data of the customer 102, an iris pattern of the customer 102, or the like. The PIN may be a secret password known only to the customer. In some examples, as per regulations, entering both the biometric information and the PIN, is a form of two-factor authentication which helps in reducing fraudulent transactions. In one embodiment, the customer 102 can provide biometric credential via the merchant wallet application present in the merchant device 104.

At 504, the merchant device 104 transmits the biometric information, the PIN, merchant wallet details, and payment details to the acquirer 122. The acquirer 122 identifies the transmission as biometric wallet pull payment transaction and transmits the biometric information, the PIN, the merchant wallet details, and the payment details to the payment network 108 (see, 506). The payment network 108 routes the biometric information, the PIN, merchant ID, and payment details to the server system 118 (see, 508).

Figure 10A:
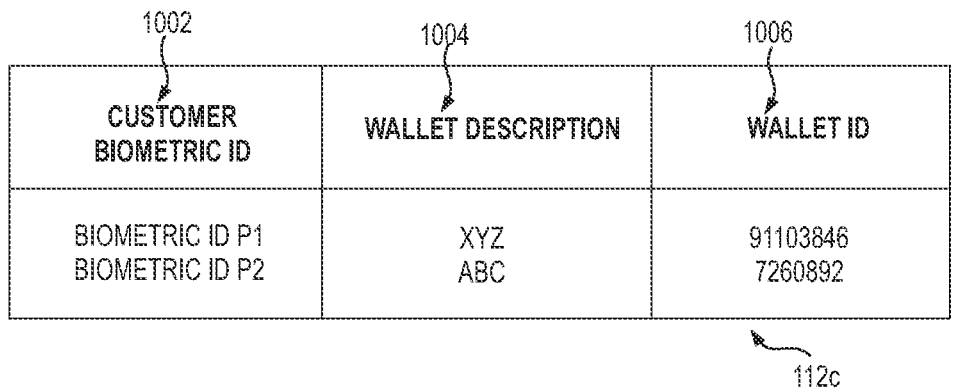
FIGS. 10A-10B illustrate example representations of databases storing biometric information of customer and merchant details.
Figure 10B:
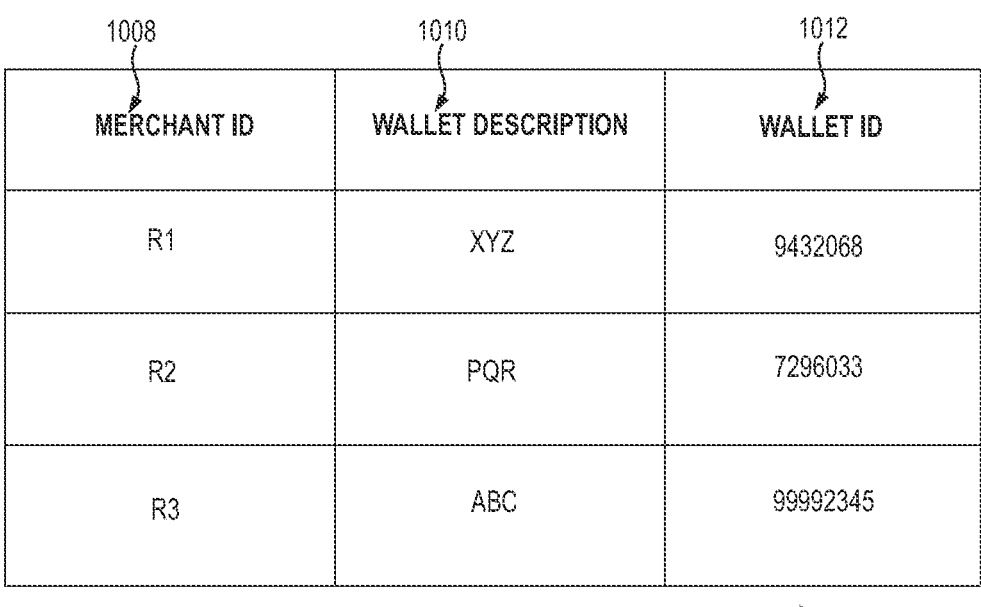

At 510, the server system 118 validates the biometric information of the customer 102. The server system 118 matches the received biometric information with the already stored values of biometric information or biometric ID (e.g., see 1002 in the biometric database 112c shown in FIG. 10A). The server system 118 also identifies in the biometric database 112c, a wallet description 1004 associated with customer wallet and wallet ID 1006 associated with the received biometric information of the customer 102. The server system 118 identifies merchant wallet using the merchant ID by searching in the merchant database 112d as shown in FIG. 10B accessible to the server system 118. After successfully validating the biometric information, the server system 118 generates a pull payment request from the identified customer wallet. The server system 118 transmits the pull payment request to the customer wallet server 110 at 512. The customer wallet server 110 approves the pull payment and transmits the response to the server system 118. In response, the server system 118 transmits to the customer wallet server 110, a request to credit payment in the merchant wallet (see, 514).

At 516, the payment is credited in the merchant wallet and a response of successful payment is transmitted to the server system 118. At 518, the server system 118 forwards the successful payment response to the acquirer 122, which forwards it to the merchant device 104 via the acquirer 122 (see, 520 and 522). The successful transaction is displayed on the merchant device 104 and a payment receipt is generated (see, 524).

Figure 6:
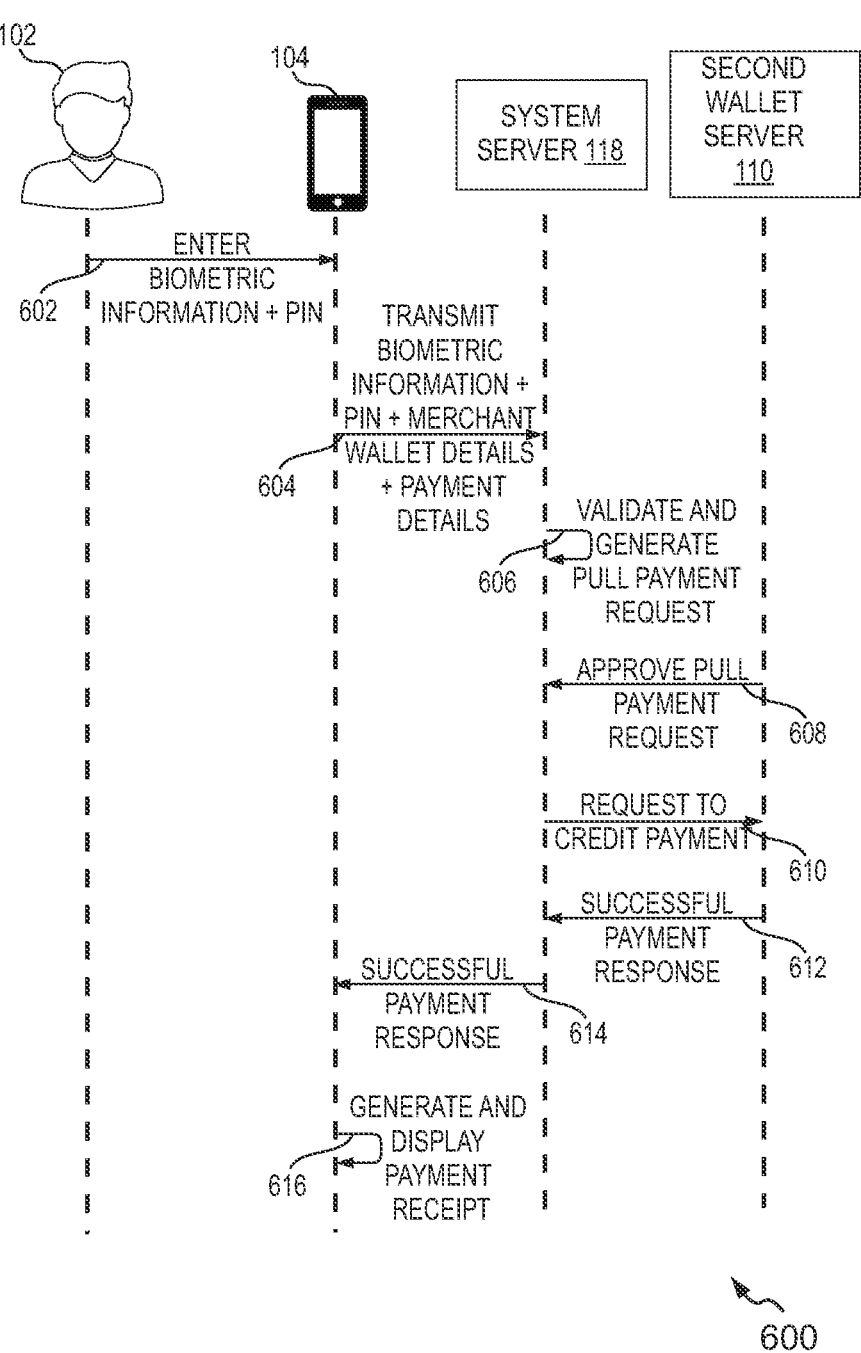
FIG. 6 is a sequence flow diagram for illustrating a payment transaction on a merchant device using a new terminal to capture biometric information and facilitate payment.

FIG. 6 is a sequence flow diagram of a method 600 of payment transaction on the merchant device 104, in accordance with another embodiment of present invention. The sequence of operations of the method 600 may not be necessarily executed in the same order as it is presented. Further, one or more operations may be grouped together and performed in the form of a single step, or one operation may have several sub-steps that may be performed in parallel or in a sequential manner. It is to be noted that the customer 102 already registers customer biometric information and PIN with the server system in a registration process similar to that described in FIG. 3. A biometric database 112c that is accessible to the server system 118 stores biometric information and wallet details associated with the customer 102.

The method 600 is performed on the merchant device 104 that may be a terminal to capture biometric information and facilitate payment. At 602, the customer 102 visits a merchant store for making a purchase. The customer accesses the merchant device 104 for conducting a transaction. The customer 102 enters his biometric information and a PIN on the merchant device 104. As described above, the biometric information includes, but is not limited to, a fingerprint of the customer 102, a facial identification data of the customer 102, an iris pattern of the customer 102, or the like. The PIN may be a secret password known only to the customer.

Entering both the biometric information and the PIN, is a form of two-factor authentication which helps in reducing fraudulent transactions. In one embodiment, the customer 102 can provide biometric credential via the merchant wallet application present in the merchant device 104.

At 604, the merchant device 104 identifies the transmission as biometric wallet pull payment transaction and transmits the biometric information, the PIN, the merchant identification, and the payment details to the server system 118 associated with the payment network 108.

At 606, the server system 118 validates the biometric information of the customer 102. The server system 118 matches the received biometric information with the already stored values of biometric information 1002 in the biometric database 112c as shown in FIG. 10A. The server system 118 also identifies in the biometric database 112c, a wallet description 1004 associated with customer wallet and wallet ID 1006 associated with the received biometric information. The server system 118 identifies merchant wallet using the merchant ID by searching in the merchant database 112d as shown in FIG. 10B accessible to the server system 118. After successfully validating the biometric information, the server system 118 generates a pull payment request from the customer wallet. The server system 118 transmits the pull payment request to the customer wallet server 110.

At 608, the customer wallet server 110 approves the pull payment and transmits the response to the server system 118. In response, the server system 118 transmits, to the customer wallet server 110, a request to credit payment in the merchant wallet (see, 610).

Further, at 612, payment is credited in merchant wallet and a response of successful payment is transmitted to the server system 118. At 614, the server system 118 forwards the successful payment response to the merchant device 104. The successful transaction is displayed on merchant device 104 and payment receipt is generated (see, 616).

FIGS. 7A-7G illustrate example representations of user interfaces (UIs) related to payment transaction from a merchant wallet application in the merchant device 104 using APIs associated with the payment network 108. It should be understood that the UIs shown in FIGS. 7A-7G are for only example purposes, and they can be configured in a variety of ways.

Figure 7A:
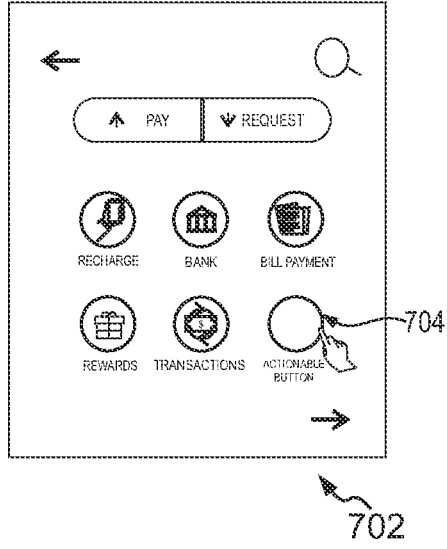
FIGS. 7A-7G illustrate example representations of user interfaces related to payment transaction from a merchant wallet application in a merchant device using APIs associated with a server system of a payment network.

FIG. 7A represents a graphical user interface (GUI) 702 of the merchant wallet application 120. The GUI 702 has an actionable button 704 of an application protocol interface of the server system 118 that facilitates the 'payment transaction service'. When the customer 102 selects the actionable button 704, a new UI is displayed as FIG. 7B.

Figure 7B:
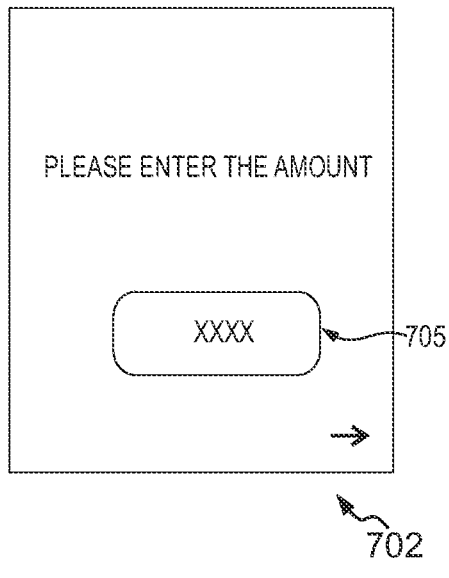

As shown in the illustrated GUI 702 of FIG. 7B, the customer 102 is prompted to enter the amount for the transaction (see, 705). As the customer 102 enters the amount for the transaction, the customer 102 is directed to another window illustrated in FIG. 7C. The customer 102 is required to choose from multiple options of entering the customer credential. For example, as shown in FIG. 7C, the customer 102 needs to select one of: a VPA button 706 or a biometric information button 708 for completing the payment transaction.

Figures 7C, 7D, 7E:
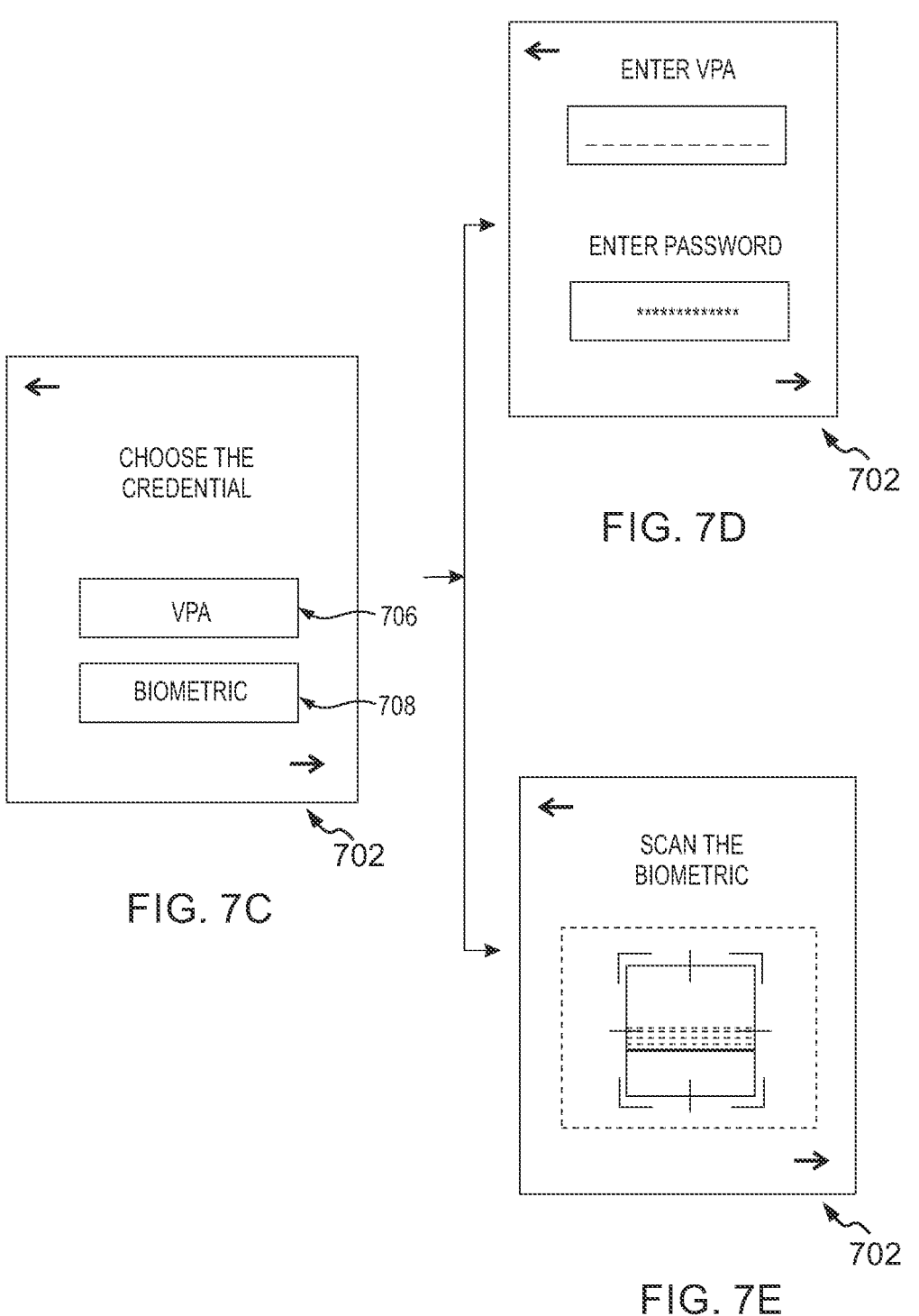

In case, the customer 102 selects the VPA button 706, the customer 102 is directed to another window as shown in FIG. 7D. The customer 102 is prompted to enter his VPA and a service password. In case the customer 102 selects the biometric information button 708, the customer 102 is directed to another window as shown in FIG. 7E, wherein the customer 102 is prompted to enter biometric data. As discussed above, the biometric data include, but are not limited to, a fingerprint of the customer 102, a facial identification data of the customer 102, an iris pattern of the customer 102, or the like.

Figures 7F, 7G:
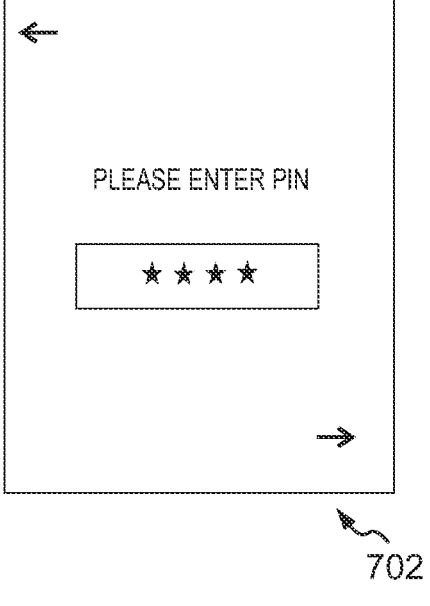

After entering the customer credential i.e. either the VPA or the biometric information, the customer 102 is prompted to enter a PIN as shown in FIG. 7F. After the customer 102 enters the PIN and if the transaction is approved, the customer 102 is directed to another window as shown in FIG. 7G indicating a successful transaction. The customer 102 is also provided with the option of downloading the receipt of the payment transaction as indicated by button 710.

FIGS. 8A-8F illustrate example representations of user interfaces related to registration in a customer wallet application interface, on a customer device, with an API associated with the payment network 108.

Figure 8A:
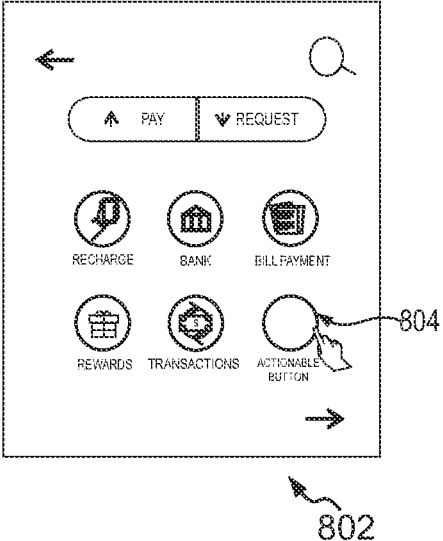
FIGS. 8A-8F illustrate example representations of user interfaces related to registration in a customer wallet application interface, on a customer device, with an API associated with the server system of the payment network.

FIG. 8A represents a graphical user interface (GUI) 802 of the customer wallet application. The GUI 802 has an actionable button 804 of an application protocol interface of the server system 118 that facilitates the 'payment transaction service'. When the customer 102 selects the actionable button 804, a new UI is displayed as FIG. 8B.

Figures 8B, 8C, 8D:
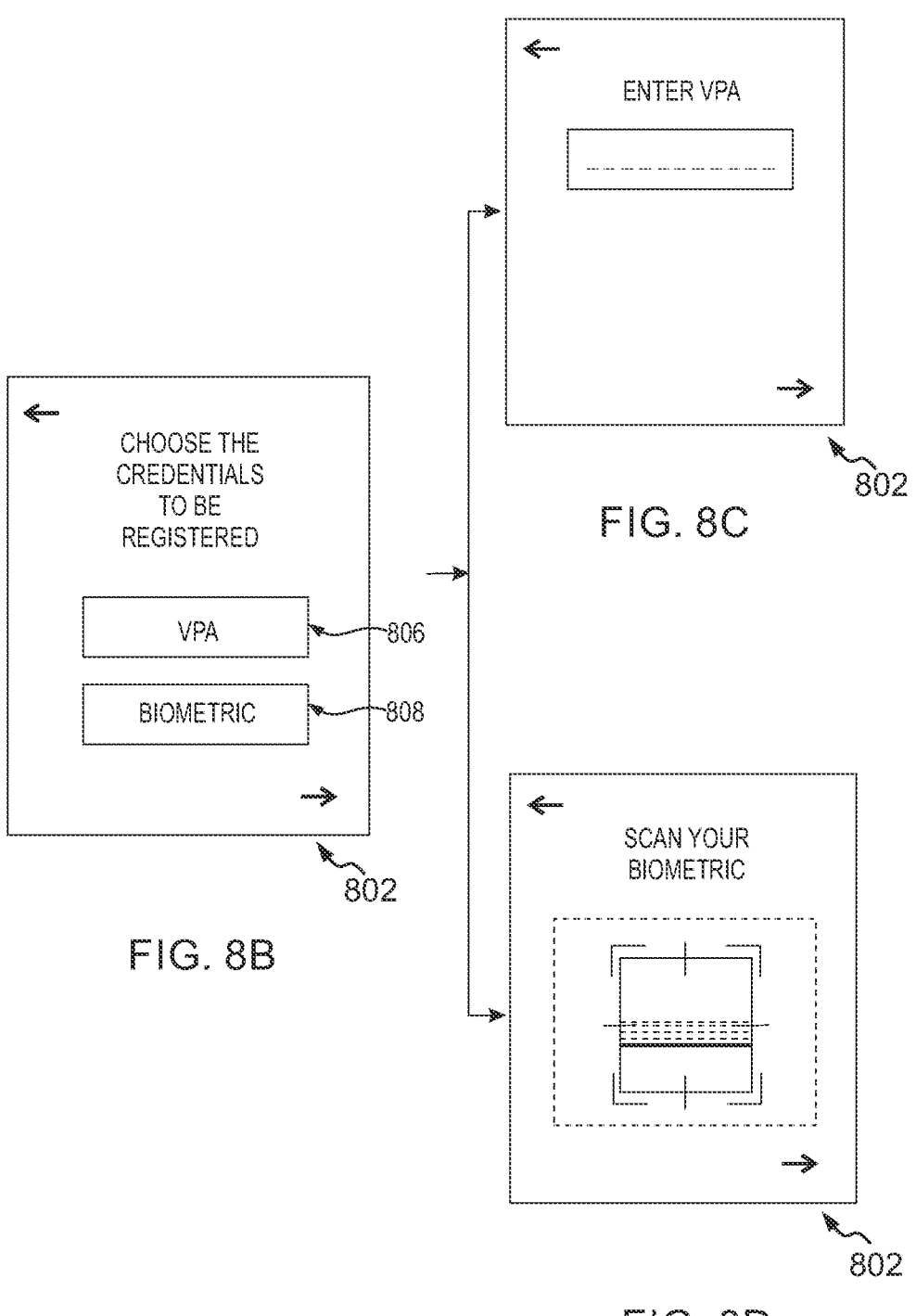

As shown in the illustrated GUI 802 of FIG. 8B, the customer 102 is prompted to select from multiple options of registering the customer credential. For example, as shown in FIG. 8B, the customer 102 needs to select one of: a VPA button 806 or a biometric information button 808 for registering the customer credential.

In case, the customer 102 selects the VPA button 806, the customer 102 is directed to another window as shown in FIG. 8C. The customer 102 is prompted to enter the VPA of his wallet. In case the customer 102 selects biometric information button 808, window as shown in FIG. 8D pops up, wherein the customer 102 is prompted to enter biometric data. As discussed above, the biometric data include, but are not limited to, a fingerprint of the customer 102, a facial identification data of the customer 102, an iris pattern of the customer 102, or the like.

Figure 8E:
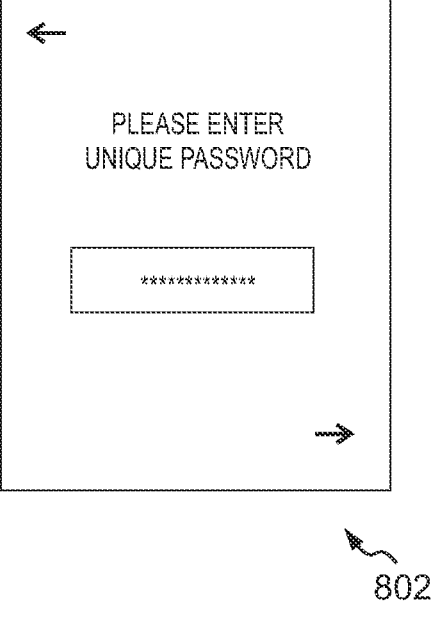
Figure 8F:
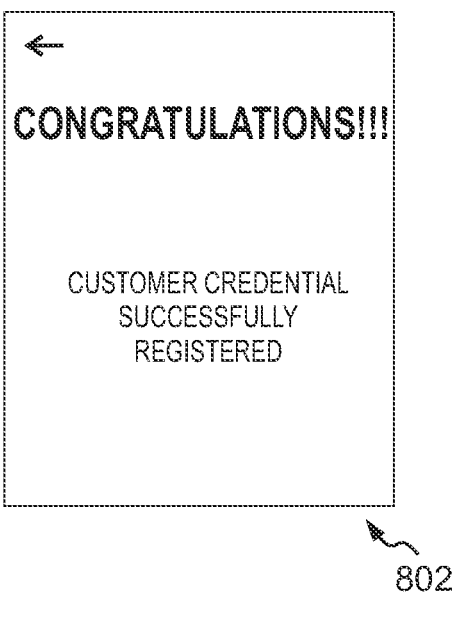

After entering the customer credential i.e. either the VPA or the biometric information, the customer 102 is prompted to enter a service password as shown in FIG. 8E. After the customer 102 enters the service password, the customer 102 is directed to another window indicating a successful registration as shown in FIG. 8F.

FIGS. 9A-9B illustrate example representations of databases storing VPA and transaction information, related to at least one embodiment. The VPA-C of the customer 102 is stored in a VPA database 112a accessible to the server system 118.

As shown in illustrated representation of FIG. 9A, the VPA database 112a includes fields like VPA 902, service password 904, device ID 906, SIM details 908, and mobile number 910. A customer 102 may have different VPAs for the same device with different passwords and mobile numbers. Further, the VPA database 112a may store details of one or more customers. For example, VPA 902 of the customer 102, possessing a device with device ID 906 as D1, can be "abc@ybc". The corresponding service password 904 for the VPA 902 maybe "lxxx". The SIM details 908 and mobile number 910 of the customer 102 can be "123456789012/01" and "73xxxxxxxx" respectively. Further, the customer 102, may have another VPA "abc@rst", a different service password "3xxx" and different SIM details "123456789012/02" and mobile number "98xxxxxxxx."

The details of a payment transaction are stored in a transaction database 112b accessible to the server system 118 as shown in FIG. 9B. The transaction database 112b includes fields like transaction ID 952, VPA of customer wallet 954, VPA of merchant wallet 958, device ID of merchant 960, and transaction amount 962. Additionally, validation result of the service password is also stored in the transaction database 112b as indicated in "Password Validation" field 956. If the password is successfully validated, the value stored in the "Password Validation" field 956 is "y" otherwise the value stored is 'n'.

FIGS. 10A-10B, collectively, illustrate example representations of databases storing biometric information of customer and merchant details. The biometric information of the customer 102 is stored in a biometric database 112c accessible to the server system 118.

As shown in illustrated representation of FIG. 10A, fields like customer biometric ID 1002, wallet description 1004, and wallet ID 1006 are stored. A customer 102 may have different biometric IDs registered for different wallets. For example, as shown in FIG. 10A, a customer 102 may have "Biometric ID P1" corresponding to "XYZ" wallet, where "Biometric ID P1" corresponds to the fingerprint of an index finger of the customer 102. Further, the customer 102 may have "Biometric ID P2" corresponding to "ABC" wallet, where "Biometric ID P2" corresponds to the fingerprint of a thumb of the customer 102. Similarly, same customer 102 may have multiple wallet accounts registered for multiple biometrics. Further, the biometric database 112c may store details of one or more customers.

The details of the merchant 106 are stored in a merchant database 112d as shown in FIG. 10B. The merchant database 112d includes fields like a merchant ID 1008, a wallet description 1010 and a wallet ID 1012. The merchant 106 may have multiple wallets registered with different wallet ID and merchant IDs.

FIG. 11 is a flow diagram depicting a method 1100 for enabling an electronic payment from a merchant device, in accordance with an embodiment. The method 1100 depicted in the flow diagram may be executed, for example, by a server system such as the server system 118 explained with reference to FIGS. 2-6. Operations of the flow diagram, and combinations of operation in the flow diagram, may be implemented by, for example, hardware, firmware, a processor, circuitry and/or a different device associated with the execution of software that includes one or more computer program instructions.

In one embodiment, the method 1100 in the flow diagram may be executed by the server system 118 associated with the payment network 108, such as the Mastercard® payment system interchange network. The method 1100 starts at operation 1110.

At 1110, the method 1100 includes receiving, by the server system 118, a customer credential associated with a customer wallet from the merchant wallet application 120 accessible in the merchant device 104. In one exemplary embodiment, the customer credential may be VPA associated with the customer wallet application and service password. In another exemplary embodiment, the customer credential may be biometric data. The biometric data include, but are not limited to, a fingerprint of the customer 102, a facial identification data of the customer 102, an iris pattern of the customer 102, or the like. Examples of the merchant device 104 include, but are not limited to, a personal computer (PC), a mobile phone, a tablet device, a Personal Digital Assistant (PDA), a voice activated assistant, a smartphone, and a laptop. In one exemplary embodiment, the customer 102 may enter the customer credential on the merchant wallet application 120 present on the merchant device 104. In another exemplary embodiment, the customer 102 may scan the biometric data on the merchant device 104.

At 1120, the method 1100 includes validating, by the server system 118, the received customer credential based at least on a stored customer credential present in a database 112 accessible to the server system 118. In an exemplary embodiment, the method 1100 includes validating the received VPA and the service password. In another exemplary embodiment, the method 1100 includes validating, by the server system 118, the biometric information by matching it with the already stored biometric information stored in the database 112. At 1130, the method 1100 further includes generating, by the server system 118, a payment request signal using the customer credential associated with the customer wallet and a merchant credential. In one exemplary embodiment, the method 1100 further includes generating the payment request signal using the following:

a) VPA of the customer wallet (VPA-C) and VPA of the merchant wallet (VPA-M);

b) contact number and SIM details of the customer 102 stored in the database 112;

c) device identification ID of the customer 102 stored in the database 112; and d) VPA-PIN associated with the VPA-C.

In another exemplary embodiment, the method 1100 further includes generating the payment request signal using biometric information of the customer 102; and wallet IDs of customer 102 and merchant 106 which are stored in the biometric database 112*c* and merchant database 112*d*.

At 1140, the method 1100 includes transmitting, by the server system 118, the payment request signal to a wallet server 110 of the customer 102. At 1150, the method 1100 includes receiving, by the server system 118, a successful payment signal representing a payment transaction from the wallet server 110 of the customer 102 to a wallet server 116 of the merchant 106.

Thereafter, at 1160, the method 1100 further includes transmitting, to the merchant device 104 by the server system 118, a notification signal including successful payment information.

FIG. 12 is a flow diagram depicting a method 1200 for enabling an electronic payment from a merchant device, in accordance with another embodiment. The method 1200 depicted in the flow diagram may be executed, for example, by a server system such as the server system 118 explained with reference to FIGS. 2-6. Operations of the flow diagram, and combinations of operation in the flow diagram, may be implemented by, for example, hardware, firmware, a processor, circuitry and/or a different device associated with the execution of software that includes one or more computer program instructions.

In one embodiment, the method 1200 in the flow diagram may be executed by the server system 118 associated with the payment network 108, such as the Mastercard® payment system interchange network. The method 1200 starts at operation 1210.

At 1210, the method 1200 includes facilitating an actionable button for accessing a payment transaction service on a user interface (UI) displayed on a merchant wallet application 120. The actionable button is accessed by a customer 102 to provide a VPA of the customer wallet and a service password for the customer 102 to access the payment transaction service as shown in FIG. 7A. The UI is associated with the server system 118. The service password is associated with the payment transaction service provided by the server system 118.

At 1212, the method 1200 further includes receiving the VPA of the customer wallet, the service password, payment details, and a VPA of a merchant wallet from the UI in the merchant wallet application 120 accessible in the merchant device 104. Examples of the merchant device 104 include, but are not limited to, a personal computer (PC), a mobile phone, a tablet device, a Personal Digital Assistant (PDA), a voice activated assistant, a smartphone, and a laptop. In one exemplary embodiment, the customer 102 may enter the customer credential on the merchant wallet application 120 present on the merchant device 104. In another exemplary embodiment, the customer 102 may scan the biometric data on the merchant device 104.

At 1214, the method 1200 includes validating the received VPA of the customer wallet and the service password based at least on a stored VPA of the customer wallet and service password present in the database 112 accessible to the server system 118. The server system 118 validates the VPA by comparing the received VPA and service password with corresponding values stored in a database (e.g., the VPA database 112*a* shown in FIG. 9A) accessible to the server system 118.

At 1216, the method 1200 further includes generating, by the server system 118, a payment request signal based at least on the VPA of the customer wallet and the VPA of the merchant wallet. In one exemplary embodiment, the method 1200 further includes generating the payment request signal using the following:

a) VPA of the customer wallet (VPA-C) and VPA of the merchant wallet (VPA-M);

b) contact number and SIM details associated with the customer 102 stored in the database 112;

c) device identification ID of the customer 102 stored in the database 112; and d) VPA-PIN associated with the VPA-C.

At 1218, the method 1200 includes transmitting, by the server system 118, the payment request signal to a wallet server 110 of the customer 102. At 1220, the method 1200 includes receiving, by the server system 118, a successful payment signal representing a payment transaction from the wallet server 110 of the customer 102 to a wallet server 116 of the merchant 106.

Finally, at 1222, the method 1200 further includes transmitting, to the merchant wallet application 120 on the merchant device 104 by the server system 118, a notification signal including the successful payment information to the merchant wallet application 120 on the merchant device 104.

Figure 13:
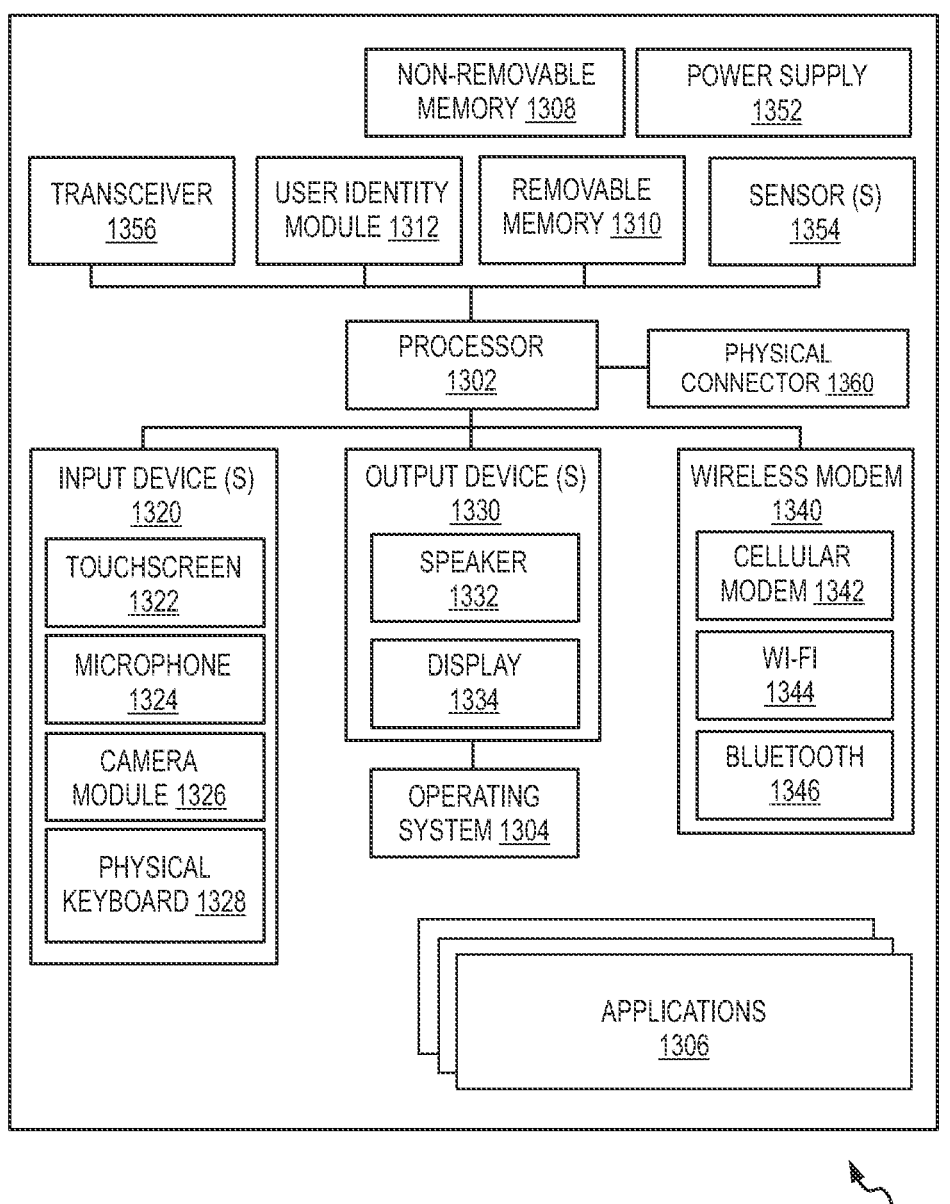
FIG. 13 is a simplified block diagram of an electronic device capable of implementing the various embodiments.

FIG. 13 is a simplified block diagram of an electronic device 1300 capable of implementing the various embodiments. For example, the electronic device 1300 may correspond to the merchant device 104 (shown in FIG. 1) or any electronic device which can be used for the payment. The electronic device 1300 is depicted to include one or more applications 1306.

It should be understood that the electronic device 1300 as illustrated and hereinafter described is merely illustrative of one type of device and should not be taken to limit the scope of the embodiments. As such, it should be appreciated that at least some of the components described below in connection with the electronic device 1300 may be optional and thus in an example embodiment may include more, less or different components than those described in connection with the example embodiment of the FIG. 13.

The illustrated electronic device 1300 includes a controller or a processor 1302 (e.g., a signal processor, microprocessor, ASIC, or other control and processing logic circuitry)

for performing such tasks as signal coding, data processing, image processing, input/output processing, power control, and/or other functions. An operating system 1304 controls the allocation and usage of the components of the electronic device 1300 and supports for one or more payment application programs (see, applications 1306) that implement one or more of the innovative features, such as providing an interface for making a payment using customer credential on a merchant device without using customer mobile phone or card etc. In addition, the applications 1306 may include common mobile computing applications (e.g., telephony applications, email applications, calendars, contact managers, web browsers, messaging applications) or any other computing application.

The illustrated electronic device 1300 includes one or more memory components, for example, a non-removable memory 1308 and/or a removable memory 1310. The non-removable memory 1308 and/or the removable memory 1310 may be collectively known as database in an embodiment. The non-removable memory 1308 can include RAM, ROM, flash memory, a hard disk, or other well-known memory storage technologies. The removable memory 1310 can include flash memory, smart cards, or a Subscriber Identity Module (SIM). The one or more memory components can be used for storing data and/or code for running the operating system 1304 and the applications 1306. The electronic device 1300 may further include a user identity module (UIM) 1312. The UIM 1312 may be a memory device having a processor built in. The UIM 1312 may include, for example, a subscriber identity module (SIM), a universal integrated circuit card (UICC), a universal subscriber identity module (USIM), a removable user identity module (R-UIM), or any other smart card. The UIM 1312 typically stores information elements related to a mobile subscriber. The UIM 1312 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1300 can support one or more input devices 1320 and one or more output devices 1330. Examples of the input devices 1320 may include, but are not limited to, a touchscreen/a display screen 1322 (e.g., capable of capturing finger tap inputs, finger gesture inputs, multi-finger tap inputs, multi-finger gesture inputs, or keystroke inputs from a virtual keyboard or keypad), a microphone 1324 (e.g., capable of capturing voice input), a camera module 1326 (e.g., capable of capturing still picture images and/or video images) and a physical keyboard 1328. Examples of the output devices 1330 may include but are not limited to a speaker 1332 and a display 1334. Other possible output devices can include piezoelectric or other haptic output devices. Some devices can serve more than one input/output function. For example, the touchscreen 1322 and the display 1334 can be combined into a single input/output device.

A wireless modem 1340 can be coupled to one or more antennas (not shown in the FIG. 13) and can support two-way communications between the processor 1302 and external devices, as is well understood in the art. The wireless modem 1340 is shown generically and can include, for example, a cellular modem 1342 for communicating at long range with the mobile communication network, a Wi-Fi compatible modem 1344 for communicating at short range with an external Bluetooth-equipped device or a local wireless data network or router, and/or a Bluetooth-compatible modem 1346. The wireless modem 1340 is typically configured for communication with one or more cellular networks, such as a GSM network for data and voice communications within a single cellular network, between cellular networks, or between the electronic device 1300 and a public switched telephone network (PSTN).

The electronic device 1300 can further include one or more input/output ports, a power supply 1352, sensor(s) 1354 such as biometric sensors for scanning biometric identity of an authorized customer, a transceiver 1356 (for wirelessly transmitting analog or digital signals) and/or a physical connector 1360, which can be a USB port, IEEE 1294 (FireWire) port, and/or RS-232 port. The illustrated components are not required or all-inclusive, as any of the components shown can be deleted and other components can be added.

Figure 14:
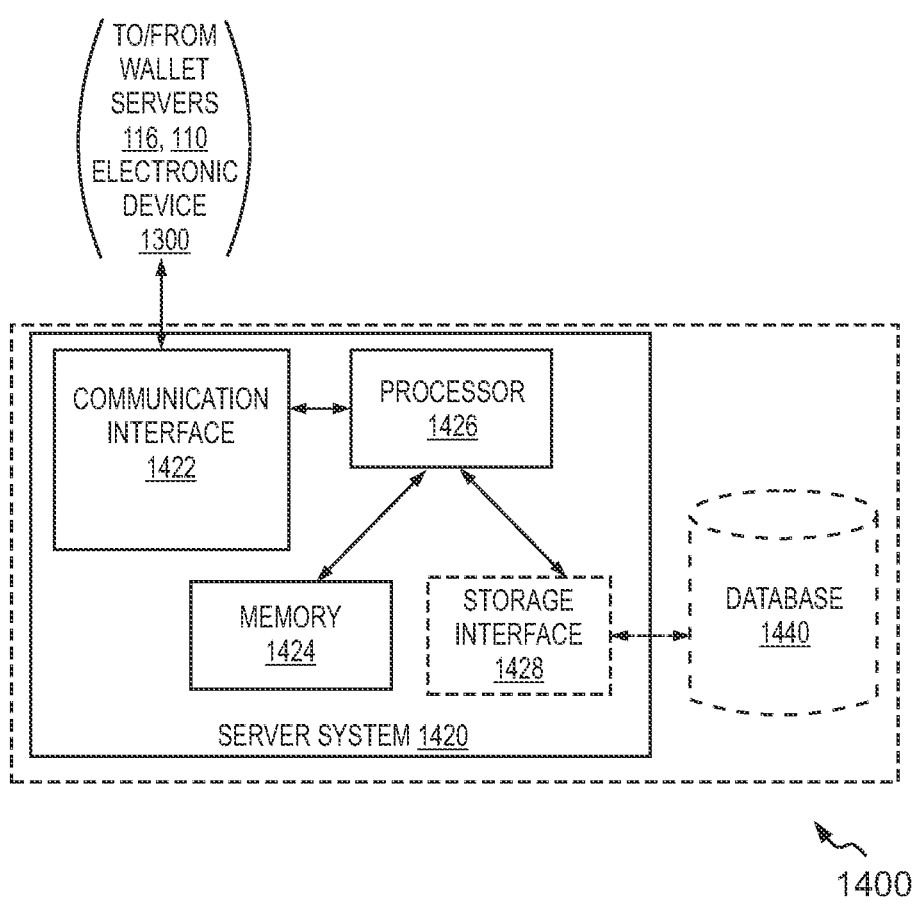
FIG. 14 represents components of a payment network, in accordance with an embodiment.

FIG. 14 represents components of a payment network 1400. The payment network 1400 includes, but is not limited to, a server system 1420 and a database 1440. The server system 1420 is configured to facilitate processing of payment transactions using encrypted images, in accordance with an example embodiment. For example, the server system 1420 may correspond to the server system 118 (shown in FIG. 1). Examples of the server system 1420 include, but are not limited to, an issuer server, a payment server, an acquirer server, a server associated with a payment gateway, and the like.

The server system 1420 includes at least one processor 1426 for executing instructions. Instructions may be stored in, for example, but not limited to, a memory 1424. The processor 1426 may include one or more processing units (e.g., in a multi-core configuration). The processor 1426 is operatively coupled to a communication interface 1422 such that the server system 1420 is capable of communicating with remote entities such as an electronic device 1300 (e.g., merchant device 104 or customer device), a wallet server (e.g., merchant wallet server 116 and customer wallet server 110) or any entity within the payment network 1400 (shown in FIG. 1). For example, the communication interface 1422 may facilitate causing display of an application interface or a Web/online interface on the merchant device 104 for enabling the customer 102 by entering customer credentials for authenticating the customer in order to make an electronic payment. The communication interface 1422 may also facilitate reception of merchant credentials and payment details. The communication interface 1422 may also facilitate communication with other entities of the payment network 1400. The communication interface 1422 may receive stored credential in the database 1440 for validation. The communication interface 1422 may receive successful payment response from the wallet server 110 of the customer 102 or from the issuer.

The processor 1426 may also be operatively coupled to the database 1440. The database 1440 is any computer-operated hardware suitable for storing and/or retrieving data, such as, but not limited to, customer payment account information, linked device IDs of the customers, and the like. The database 1440 may include multiple storage units such as hard disks and/or solid-state disks in a redundant array of inexpensive disks (RAID) configuration. The database 1440 may include a storage area network (SAN) and/or a network attached storage (NAS) system. In some embodiments, the database 1440 is integrated within the server system 1420. For example, the server system 1420 may include one or more hard disk drives as those in the database 1440. In other embodiments, the database 1440 is external to the server system 1420 and may be accessed by the server system 1420 using a storage interface 1428. The storage interface 1428 is any component capable of providing the processor 1426 with access to the database 1440. The storage interface 1428 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1426 with access to the database 1440.

The server system 1420 in conjunction with the database 1440 is configured to perform the various functions as explained with reference to the server system 118 in FIGS. 2-6. For example, the processor 1426 of the server system 1420 is configured to provide an application programming interface icon on a wallet application on an electronic device 1300. The processor 1426 is also configured to validate the customer credential by comparing the customer credential with the credential already stored at the time of registration in the database 1440. The processor 1426 is configured to identify the customer wallet and merchant wallet stored in the database based on the customer credential and merchant credential received from the merchant device. In some embodiments, the processor 1426 is also configured to generate a pull payment request using the customer credential, payment details, and the merchant credential. If the server system 1420 is embodied as an acquirer server or a server associated with a payment gateway, then the processing of the payment transaction may imply provisioning the payment transaction information to the issuer server for initiating transfer of funds from the customer payment account to the merchant payment account. If the server system 1420 is embodied as the issuer server, then the processing of the payment transaction may imply authorizing the payment account information and causing transfer of funds from the customer payment account to the merchant payment account.

Figure 15:
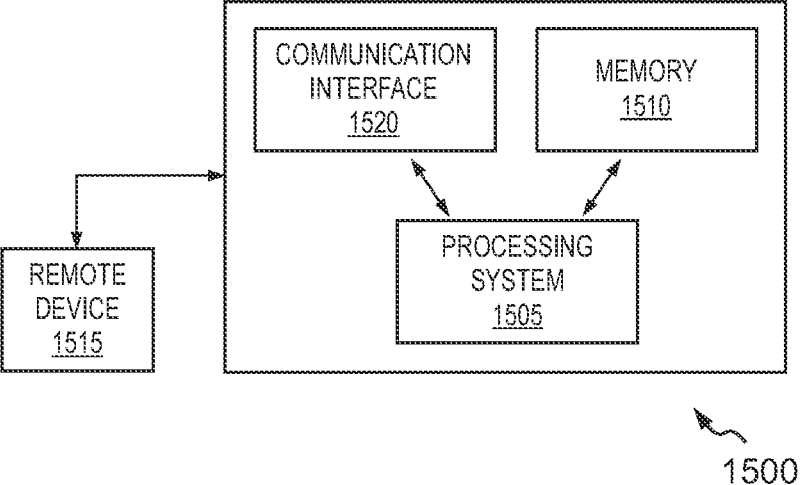
FIG. 15 is a simplified block diagram of a wallet server of the customer, in accordance with an embodiment.

FIG. 15 is a simplified block diagram of a wallet server 1500 configured to facilitate processing of payment transactions, in accordance with an example embodiment. The wallet server 1500 may correspond to customer wallet server 110 of FIG. 1. The wallet server 1500 may also correspond to merchant wallet server 116 of FIG. 1.

The wallet server 1500 includes a processing system 1505 configured to extract programming instructions from a memory 1510 to provide various features of the present disclosure. The components of the wallet server 1500 provided herein may not be exhaustive, and the wallet server 1500 may include more or fewer components than those depicted in FIG. 15. Further, two or more components may be embodied in one single component, and/or one component may be configured using multiple sub-components to achieve the desired functionalities. Some components of the wallet server 1500 may be configured using hardware elements, software elements, firmware elements and/or a combination thereof.

In one embodiment, the processing system 1505 in operable communication with an acquirer server associated with a merchant bank may be configured to cause provisioning of an interface, such as an application interface and/or online/Web interface via a communication interface 1520 for enabling wallet to wallet payment transaction using customer credential.

In another embodiment, the processing system 1505 in operable communication with an issuer server associated with an issuer bank/issuer, in which a customer may have a payment account, may be configured to cause provisioning of an interface, such as an application interface and/or online/Web interface via the communication interface 1520 for enabling wallet to wallet payment transaction using customer credential.

In one embodiment, the processing system 1505 is configured to facilitate processing of the payment transaction, i.e. to cause transfer of funds from the customer wallet account to the merchant payment account.

In some embodiments, the processing system 1505 may receive payment account information in relation to a payment transaction. The processing system 1505 may be configured to identify the customer and the customer bank by comparing the account information with a stored copy in the memory 1510 and accordingly forward the account information to the appropriate issuer 114 for processing the payment from the customer 102 to the merchant 106.

In an embodiment, a remote device 1515 may correspond to the issuer 114, the acquirer 122, the merchant device 104, the server system 118 or any other entity in the environment 100 (shown in FIG. 1).

It is to be noted that the methods described in the present disclosure are not only limited to a customer-merchant payment transaction. The described method can also be carried out to transfer funds by a payer to a payee by entering payer's credentials on wallet application of the payee. In such a case, the term payer can be referred to as a "customer" and the term payee can be referred to as a "merchant".

The disclosed embodiments with reference to FIGS. 1 to 15, or one or more operations of the flow diagrams may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 118 and the database 112 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A method of enabling an electronic payment from a merchant device, the method comprising:

presenting, by the merchant device, a graphical user interface (GUI) to a merchant wallet application accessible in the merchant device, the GUI including an actionable button of an application protocol interface (API) of a server system associated with a payment network;

receiving, by the merchant device, a selection of the actionable button;

in response to the selection, presenting, by the merchant device, a new user interface (UI) to the merchant wallet application, the new UI including a biometric information button;

receiving, by the merchant device, a selection of the biometric information button;

in response to the selection, presenting, by the merchant device, a first window of the new UI, the first window requesting biometric data;

capturing, by a biometric capturing device of the merchant device, the biometric data;

in response to capturing the biometric data, presenting, by the merchant device, a second window of the new UI requesting a personal identification number (PIN) associated with the biometric data;

receiving, by the merchant wallet application, the PIN associated with the biometric data;

receiving, by the server system, payment details, a merchant credential, and a customer credential from the merchant wallet application, the customer credential comprising the biometric data and the PIN associated with the biometric data, wherein the customer credential further comprises a virtual payment address (VPA) of the customer wallet and a service password for the customer to access the server system, and wherein the merchant credential further comprises a VPA of the merchant wallet;

validating, by the server system, the received customer credential by:

matching the biometric data to a stored biometric identifier present in a database accessible to the server system, the stored biometric identifier being associated with a customer; and verifying that the PIN matches a stored PIN linked with the stored biometric identifier;

based on validating the received customer credential, identifying, in the database by the server system, a wallet description associated with a customer wallet associated with a wallet server of the customer and a wallet identifier associated with the received biometric data of the customer;

generating, by the server system, pull payment request based at least on the customer credential, the payment details, and the merchant credential from the identified customer wallet to a merchant wallet;

transmitting, by the server system, the pull payment request to the wallet server of the customer;

receiving, by the server system, a successful payment signal representing a payment transaction from the wallet server of the customer to a wallet server of a merchant;

transmitting, by the server system, a notification signal comprising successful payment information to the merchant device, transmitting, by the server system to a wallet application of the customer, a request signal for setting up the service password;

receiving, by the server system, the service password in an encrypted format from the wallet application of the customer; and storing the service password in the database in the encrypted format with the VPA of the customer wallet, the server system configured to validate the customer credential and enable the transaction when the customer does not possess a personal mobile device linked to the customer wallet.

2. The method of claim 1, The method as claimed in claim 1, wherein generating the pull payment request comprises:

upon validating the customer credential, transmitting, by the server system to the merchant device, a signal requesting a PIN associated with the VPA of the customer wallet; and receiving, by the server system, the PIN associated with the VPA of the customer wallet, from the merchant wallet application.

3. The method as claimed in claim 2, wherein the pull payment request is generated based at least on:

(a) the VPA of the customer wallet and the VPA of the merchant wallet;

b) contact number and Subscriber Identification Module (SIM) details associated with the customer stored in the database;

c) a device identification (ID) of the customer stored in the database; and d) the PIN associated with the VPA of the customer wallet.

4. The method as claimed in claim 1, wherein the biometric data comprises one or more of the following: a fingerprint of the customer, a facial identification data of the customer, and an iris pattern of the customer.

5. The method as claimed in claim 1, further comprising:

receiving, by the server system, device details and the customer credential from the wallet server of the customer; and storing the device details and the customer credential in the database accessible to the server system.

6. The method as claimed in claim 1, further comprising storing the VP A of the merchant wallet with an identifier of the merchant.

7. A server system associated with a payment network for enabling an electronic payment from a merchant device when a customer does not possess a personal mobile device linked to a customer wallet used for the electronic payment, the server system comprising:

a communication interface;

a storage interface;

a graphical user interface (GUI) including an actionable button;

a new user interface (UI) including a biometric information button and a plurality of windows;

an application protocol interface;

a memory comprising stored instructions; and at least one processor communicably coupled to the memory, the processor configured to execute the stored instructions to cause the server system to:

present the GUI to a merchant wallet application accessible in the merchant device, receive a selection of the actionable button, in response to the selection, present the new UI to the merchant wallet application, the new UI including a biometric information button, receive a selection of the biometric information button, in response to the selection, present a first window of the new UI, the new window requesting biometric data, wherein the biometric data is captured in response to the request by the merchant device via a biometric capturing device of the merchant device, in response to the capturing of the biometric data, present a second window of the new UI requesting a personal identification number (PIN) associated with the biometric data, wherein the PIN associated with the biometric data is received by the merchant wallet application, receive payment details, a merchant credential, and a customer credential from the merchant wallet application, the customer credential comprising the biometric data and the PIN associated with the biometric data, wherein the customer credential further comprises a virtual payment address (VPA) of the customer wallet and a service password for the customer to access the server system, and wherein the merchant credential further comprises a VPA of the merchant wallet;

validate the received customer credential by:

matching the biometric data to a stored biometric identifier present in a database accessible to the server system, the stored biometric identifier being associated with the customer, and verifying that the PIN matches a stored PIN linked with the stored biometric identifier, based on validating the received customer credential, identify, in the database, a wallet description associated with the customer wallet used for the electronic payment, the customer wallet being associated with a wallet server of the customer, and a wallet identifier associated with the received biometric data of the customer, generate pull payment request based at least on the customer credential, the payment details, and the merchant credential from the identified customer wallet to a merchant wallet, transmit the pull payment request to the wallet server of the customer, receive a successful payment signal representing a payment transaction from the wallet server of the customer to a wallet server of a merchant, transmit a notification signal comprising successful payment information to the merchant device, transmit, to a wallet application of the customer, a request signal for setting up the service password;

receive the service password in an encrypted format from the wallet application of the customer; and store the service password in the database in the encrypted format with the VPA of the customer wallet.

8. The server system as claimed in claim 7, wherein in order to generate the pull payment request, the processor is configured to execute the stored instructions to further cause the server system to:

transmit upon validating the customer credential, to the merchant device, a signal requesting a personal identification number (PIN) PIN associated with the VPA of the customer wallet; and receive the PIN associated with the VPA of the customer wallet, from the merchant wallet application.

9. The server system as claimed in claim 8, wherein the pull payment request is generated based at least on:

(a) the VPA of the customer wallet and the VPA of the merchant wallet;

b) contact number and Subscriber Identification Module (SIM) details associated with the customer stored in the database;

c) a device identification (ID) of the customer stored in the database; and d) the PIN associated with the VPA of the customer wallet.

10. The server system as claimed in claim 7, wherein the biometric data comprises one or more of the following: a fingerprint of the customer, a facial identification data of the customer, and an iris pattern of the customer.

11. The server system as claimed in claim 7, wherein the processor is configured to execute the stored instructions to further cause the server system to:

receive device details and the customer credential from the wallet server of the customer; and store the device details and the customer credential in the database accessible to the server system.

* * * * *